United States Patent
Tiramani et al.

(10) Patent No.: US 11,193,574 B2
(45) Date of Patent: Dec. 7, 2021

(54) INVERTIBLE REVERSIBLE MULTI-APPLICATION GEARBOX

(71) Applicant: Auto IP LLC, Las Vegas, NV (US)

(72) Inventors: Paolo Tiramani, Las Vegas, NV (US); Kyle Denman, North Las Vegas, NV (US)

(73) Assignee: Auto IP LLC, Las Vegas, NV (US)

( * ) Notice: Subject to any disclaimer, the term of this patent is extended or adjusted under 35 U.S.C. 154(b) by 377 days.

(21) Appl. No.: 16/168,957

(22) Filed: Oct. 24, 2018

(65) Prior Publication Data

US 2019/0128381 A1     May 2, 2019

Related U.S. Application Data

(60) Provisional application No. 62/735,966, filed on Sep. 25, 2018, provisional application No. 62/616,601, (Continued)

(51) Int. Cl.
| | |
|---|---|
| *F16H 57/025* | (2012.01) |
| *B60K 17/08* | (2006.01) |
| *B60K 17/06* | (2006.01) |
| *F16H 57/04* | (2010.01) |
| *F16H 57/031* | (2012.01) |
| *F16H 3/089* | (2006.01) |

(Continued)

(52) U.S. Cl.
CPC ........... *F16H 57/025* (2013.01); *B60K 17/06* (2013.01); *B60K 17/08* (2013.01); *F16H 3/089* (2013.01); *F16H 57/031* (2013.01); *F16H 57/0441* (2013.01); *F16H 61/0025* (2013.01); *B60K 2005/003* (2013.01); *F16H 2057/0203* (2013.01); *F16H 2057/0235* (2013.01); *F16H 2057/02043* (2013.01)

(58) Field of Classification Search
CPC .. B60K 17/06; B60K 17/08; B60K 2005/003; F16H 3/089; F16H 57/025; F16H 57/031; F16H 57/0441; F16H 2057/0203; F16H 2057/0235; F16H 2057/02043; F16H 61/0025; F16H 2061/2869; F16H 61/28; F16H 2063/2056; F16H 2200/0052
See application file for complete search history.

(56) References Cited

U.S. PATENT DOCUMENTS

| | | |
|---|---|---|
| 2,850,920 A | 9/1958 | Buckendale |
| 2,873,615 A | 2/1959 | Wiken |

(Continued)

OTHER PUBLICATIONS

Susa Oil Circulation Pump, 12v. (Aug. 6, 2016). Setrab USA. https://web.archive.org/web/20160806200028/http://www.setrabusa.com/products/oilcontrol/pumps/index.html (Year: 2016).*

(Continued)

*Primary Examiner* — Joseph Brown
(74) *Attorney, Agent, or Firm* — McCarter & English, LLP

(57) ABSTRACT

A gearbox having a longitudinally-oriented input shaft for transmitting rotational force from an engine; a gear drive train, for receiving rotational force from the input shaft, which includes a plurality of meshed gear pairs mounted on first and second shafts that are laterally oriented perpendicular to the longitudinally oriented input shaft; and in one aspect a fast-change gear assembly interposed in the gear drive train for changing the torque transfer characteristics of the gearbox.

38 Claims, 17 Drawing Sheets

Related U.S. Application Data filed on Jan. 12, 2018, provisional application No. 62/577,965, filed on Oct. 27, 2017, provisional application No. 62/577,423, filed on Oct. 26, 2017.

(51) Int. Cl.
*F16H 61/00* (2006.01)
*F16H 57/02* (2012.01)
*B60K 5/00* (2006.01)
*F16H 57/023* (2012.01)

(56) References Cited

U.S. PATENT DOCUMENTS

| | | | | |
|---|---|---|---|---|
| 3,403,568 | A * | 10/1968 | Holcombe | F16H 57/031 |
| | | | | 74/333 |
| 3,749,463 | A * | 7/1973 | Krapf | F16C 35/077 |
| | | | | 384/539 |
| 3,862,672 | A * | 1/1975 | Tappen | F16N 19/006 |
| | | | | 184/6.12 |
| 5,509,862 | A | 4/1996 | Sherman | |
| 9,109,675 | B2 * | 8/2015 | Park | B60K 6/547 |
| 2004/0097322 | A1 | 5/2004 | Chakraborty | |
| 2004/0099074 | A1 | 5/2004 | Brookins | |
| 2010/0216586 | A1 | 8/2010 | Gleasman | |
| 2011/0259132 | A1 | 10/2011 | Larsen et al. | |
| 2015/0276053 | A1 * | 10/2015 | Mizuno | F16H 61/28 |
| | | | | 74/335 |
| 2016/0069446 | A1 * | 3/2016 | Konruff | F16H 57/0441 |
| | | | | 184/6.12 |
| 2017/0219081 | A1 * | 8/2017 | Abe | F16H 57/033 |
| 2018/0087656 | A1 * | 3/2018 | Poster | F16H 57/02 |
| 2019/0277223 | A1 * | 9/2019 | Phillips | F16H 57/025 |

OTHER PUBLICATIONS

"Pagani's British Gearbox—Pictures." Evo, Jan. 31, 2011, www.evo.co.uk/pagani/huayra/3587/paganis-british-gearbox-pictures. (Year: 2011).*

NPL-5 International Search Report and Written Opinion of the International Searching Authority in PCT/US2019/059211, dated Jan. 9, 2020.

NPL-6 International Search Report and Written Opinion of the International Searching Authority in PCT/US2018/057216, dated Jan. 4, 2019.

NPL-3 Facebook Post Feb. 3, 2017. https://www.facebook.com/SupercarSystem/posts/727402677419823:0.

NPL-4 Facebook Post May 7, 2017. https://www.facebook.com/SupercarSystem/posts/788183328008424:0.

NPL-5 Facebook Post May 2, 2016. https://www.facebook.com/SupercarSystem/posts/591367204356705:0.

U.S. Appl. No. 16/579,554, filed Sep. 23, 2019, Paolo Tiramani et al.

U.S. Appl. No. 16/579,524, filed Sep. 23, 2019, Paolo Tiramani et al.

U.S. Appl. No. 16/579,571, filed Sep. 23, 2019, Paolo Tiramani et al.

U.S. Appl. No. 16/589,308, filed Oct. 1, 2019, Paolo Tiramani et al.

NPL 1—http://garage.grumpysperformance.com/index.php?threads/anyone-running-a-quick-change-rear.4801/.

NPL 2—http://st.hotrod.com/uploads/sites/21/2010/10/1010sr_24_o-quick_change_rear_end-gears.jpg.

Marriage, Ollie, Pagani's British gearbox, https://www.evo.co.uk/pagani/huayra/11543/paganis-british-gearbox, Jan. 31, 2011.

* cited by examiner

INVERTIBLE REVERSIBLE MULTI-APPLICATION GEARBOX

CROSS-REFERENCES TO RELATED APPLICATIONS

This application claims the benefit of U.S. Provisional Application No. 62/577,423, filed Oct. 26, 2017, U.S. Provisional Application No. 62/577,965, filed Oct. 27, 2017, U.S. Provisional Application No. 62/616,601, filed Jan. 12, 2018 and U.S. Provisional Application No. 62/735,966, filed Sep. 25, 2018.

BACKGROUND OF THE INVENTION

Field of the Invention

This invention relates to gearbox design.

Description of the Related Art

Gear systems are used in order to better match the torque, power and rotational speed characteristics of a rotating power source with the needs of the application. In the case of gearboxes used in connection with internal combustion engines for automotive applications, current designs generally are limited to use in relatively narrow performance bands, and do not lend themselves well to use in a wide variety of different types of vehicles. For example, a gearbox suitable for a high performance automobile intended for a paved racetrack may prove unsuitable if used in an off-road vehicle.

This drawback of current automotive gearbox design may be particularly experienced, for example, in the case of a base vehicle intended to be marketed for different applications, such as for street, track, off-road, etc. Current options may disadvantageously require the gearbox manufacturer to offer a number of gearbox/differential/transfer case units of different design, since a gearbox having appropriate power transmission characteristics for one application may not be appropriate for another desired application. Likewise, an automotive manufacturer may need to order and maintain a different gearbox for each of its offerings intended for a different target performance market.

This drawback also presents itself in the case of vehicles which may be modified or customized post-sale by automotive enthusiasts. For such vehicles, a decision to change the performance characteristics of the vehicle might necessitate purchase and installation of a different gearbox design, at substantial time and expense.

SUMMARY OF THE INVENTION

The present invention provides a gearbox design that can be used for a wide variety of applications that heretofore could require different gearboxes. The gearbox disclosed herein, which preferably is a transaxle design including both the primary engine gearing and the differential gearing used to rotate the driving wheels, is characterized by being 180° reversible in the lateral plane (i.e., the "front" of the gearbox in one application can be reoriented to be the rear in another application) and by being 180° invertible in the vertical plane (i.e., the "top" of the gearbox in one application can be turned upside-down to be the bottom in another application). A gearbox that is reversible in the lateral plane in accordance with the present invention advantageously permits its use, with equal facility, in combination with an engine either positioned ahead of the drive wheels, or behind the drive wheels, in accordance with preference. Still further, a gearbox that is invertible in the vertical plane in accordance with the present invention can advantageously effect a substantial change in the ride height of the vehicle, as may be required in different applications. The gearbox of the present invention is suited for use in vehicles which may be modified or customized post-sale, such as those disclosed in U.S. Patent Publication No. 2015/0210319 A1.

In one aspect, the present invention is directed to a gearbox comprising a gearbox housing, and a gear drive train that includes a first shaft within the gearbox housing for transmitting rotational force from an engine and a second shaft within the gearbox housing for transmitting rotational force to drive wheels. There is further provided a plurality of meshed gear pairs mounted on the first shaft and the second shaft within the gearbox housing, and means for selectively engaging one of said plurality of meshed gear pairs for transmitting rotational force from the first shaft to the second shaft. In addition, the gearbox includes a fast-change gear assembly mounted on the exterior of the gearbox housing and interposed in the gear drive train, the fast-change gear assembly including a driving gear mounted on a driving shaft for receiving rotational force, and a driven gear mounted on a driven shaft for transmitting rotational force, the driving gear and the driven gear each having gear teeth in meshing relationship, either directly or through an idler gear. The driving gear is rotationally coupled to the driving shaft so as to rotate with the rotation of the driving shaft, and translationally uncoupled to the driving shaft to permit removal of the driven gear. The driven gear is rotationally coupled to the driven shaft so as to rotate the driven shaft upon rotation of the driven gear, and translationally uncoupled to the driven shaft to permit removal of the driven gear.

In another aspect of the present invention, there is provided an invertible multi-application gearbox, comprising a gearbox housing with a gear drive train within the gearbox housing, the gear drive train including an input shaft for transmitting rotational force from an engine to the gear drive train, and an output shaft for transmitting rotational force to drive wheels. There is also a plurality of gears within the gearbox housing, and means for selectively engaging one of said plurality of gears for transmitting rotational force from the input shaft to the output shaft. The gears are approximately symmetrically distributed about a vertical plane containing the centerline of the input shaft, the output shaft is separated a vertical distance from a horizontal plane containing the centerline of the input shaft, and the gearbox housing includes a plurality of mounting location fixtures that are symmetrically disposed above and below a lateral plane containing the axial centerline of the input shaft and around such axial centerline to permit mounting the gearbox to an engine in either an upright or inverted position.

These and other aspects of the present invention are described in the drawings annexed hereto, and in the description of the preferred embodiments and claims set forth below.

BRIEF DESCRIPTION OF THE DRAWINGS

FIG. 6A corresponds with the drive train configuration depicted in the schematic perspective view of FIG. 1.

DETAILED DESCRIPTION OF THE PREFERRED EMBODIMENTS

Figure 1:
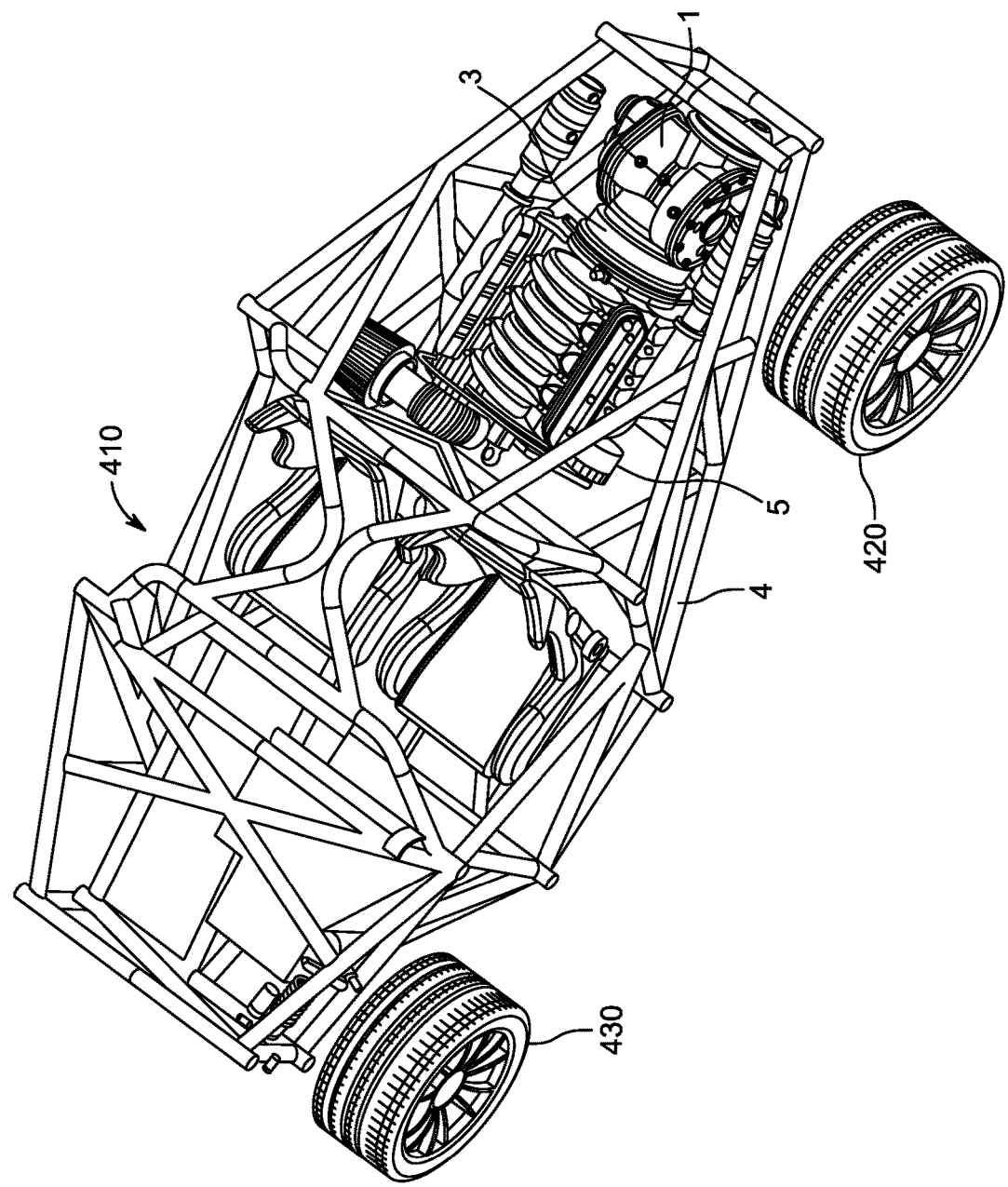
FIG. 1 is a schematic perspective view of a vehicle that includes the gearbox of the present invention, without body panels and without certain other components for purposes of illustration.

In the embodiment of the present invention depicted in FIG. 1, there is a gearbox 1 mounted on a clutch housing 3, which is bolted to an engine 5 that is positioned to the rear of the passenger compartment 410 of vehicle 4. A clutch assembly (not visible) is contained within clutch housing 3. FIG. 1 further shows the locations of rear wheel 420 and front wheel 430. In the embodiment of FIG. 1, vehicle 4 is a rear-wheel drive vehicle; i.e., gearbox 1 rotates rear wheel 420 (and its counterpart on the right side of vehicle 4, which is not shown).

The embodiment shown in FIG. 1 is a mid-engine, rear wheel drive configuration with the engine 5 located to the rear of the passenger compartment 410 and ahead of the rear axle, and the gearbox 1 mounted rearward of the engine 5. Although vehicle 4 is illustrated in FIG. 1 as having a tubular exoskeleton, the present invention is applicable to vehicles having a wide variety of structural configurations, such as uni-body, ladder chassis, etc. As referenced above, gearbox 1 preferably is a transaxle design, integrating in one housing both primary engine gearing and the gearing used to differentially rotate the driving wheels. A transaxle design is preferred to provide a compact powertrain.

Gearbox Geometry

Figure 2A:
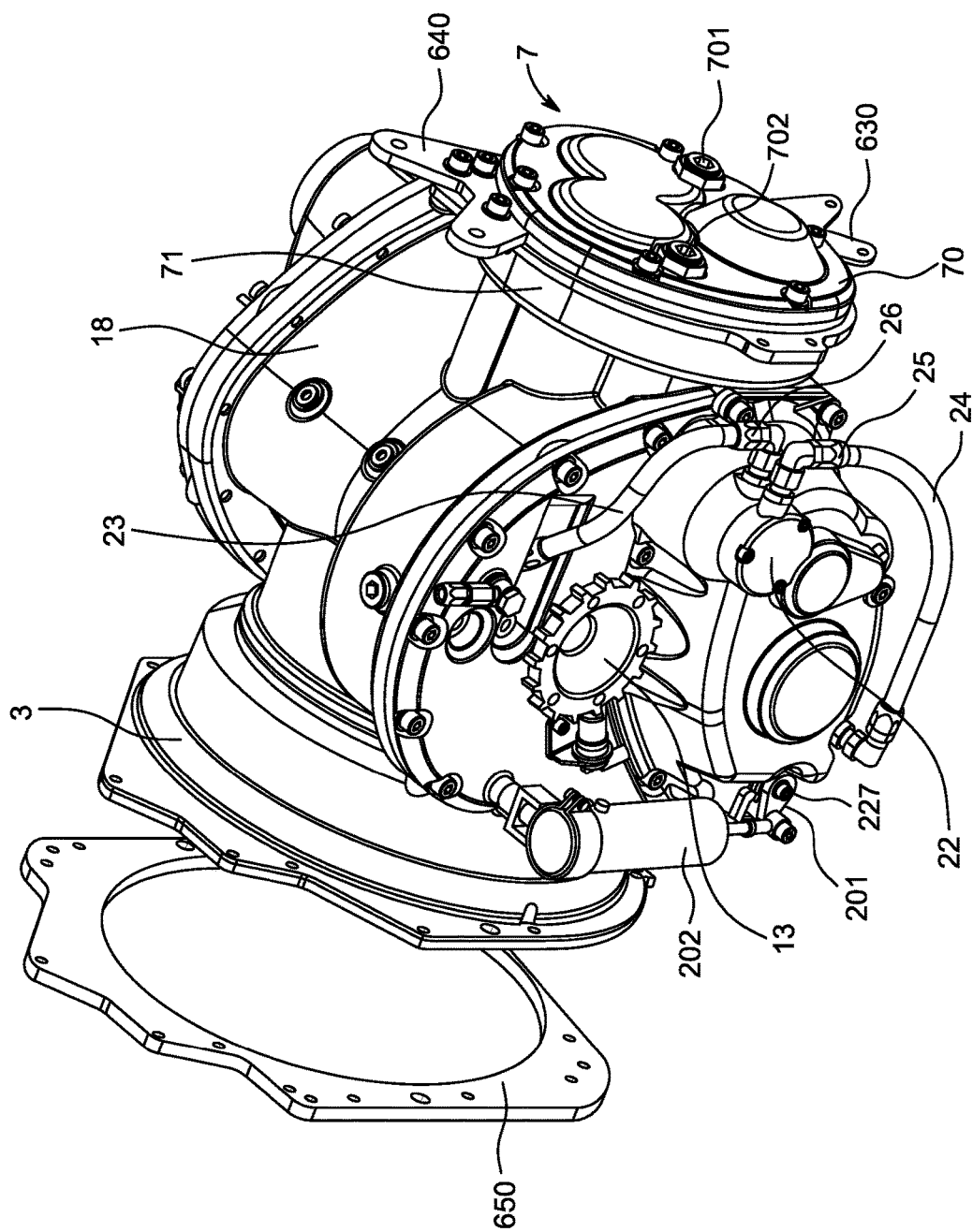
FIG. 2A depicts an exterior perspective view of the preferred embodiment of the gearbox of the present invention.
Figure 2B:
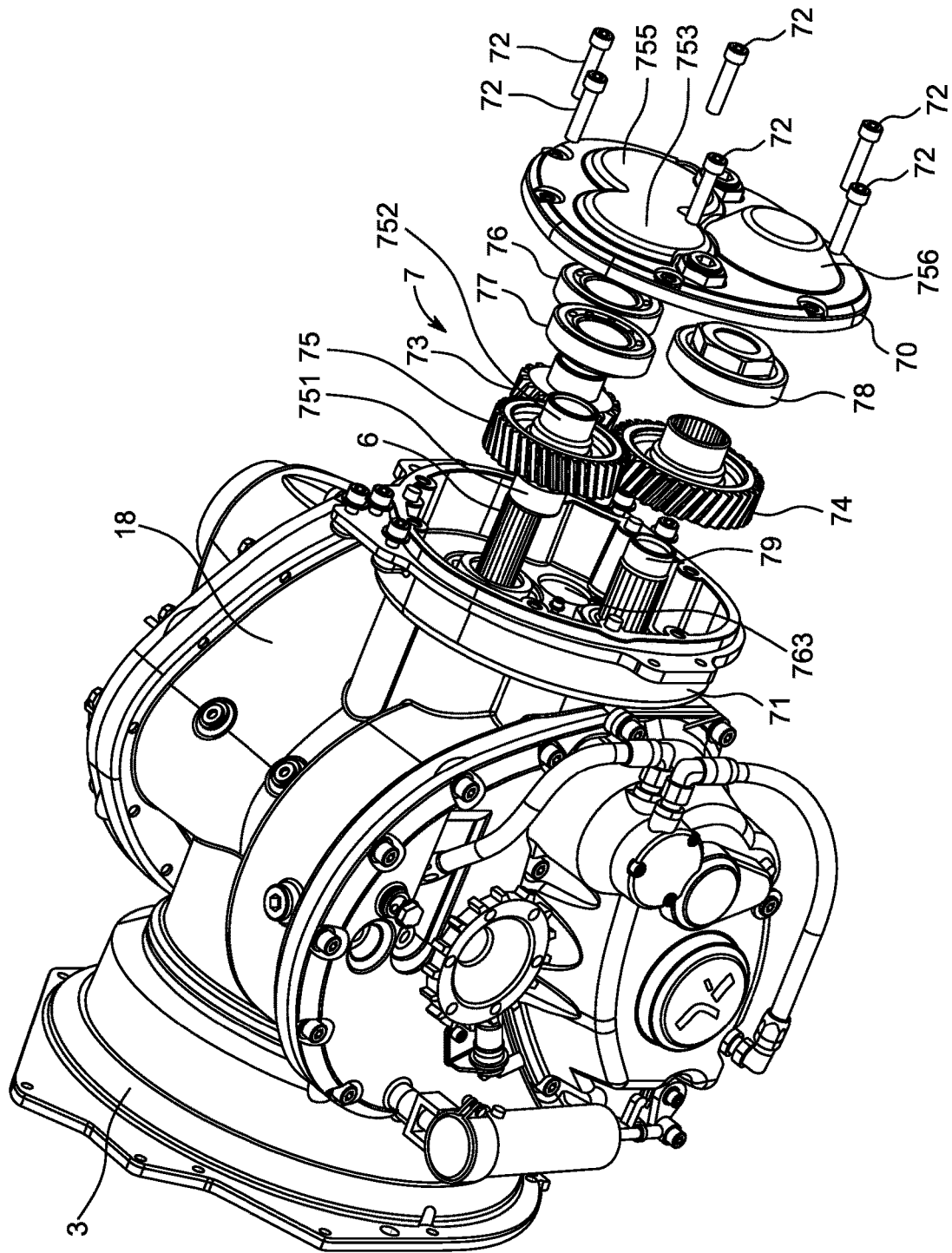
FIG. 2B depicts an exterior perspective view of the preferred embodiment of the gearbox of the present invention, with the fast change gear assembly illustrated in exploded form.

Gearbox 1 in FIGS. 2A and 2B has generally the same orientation as gearbox 1 depicted in FIG. 1; for clarity, clutch housing 3 shown in FIG. 2A would be bolted to the output end of engine 5.

Figure 2C:
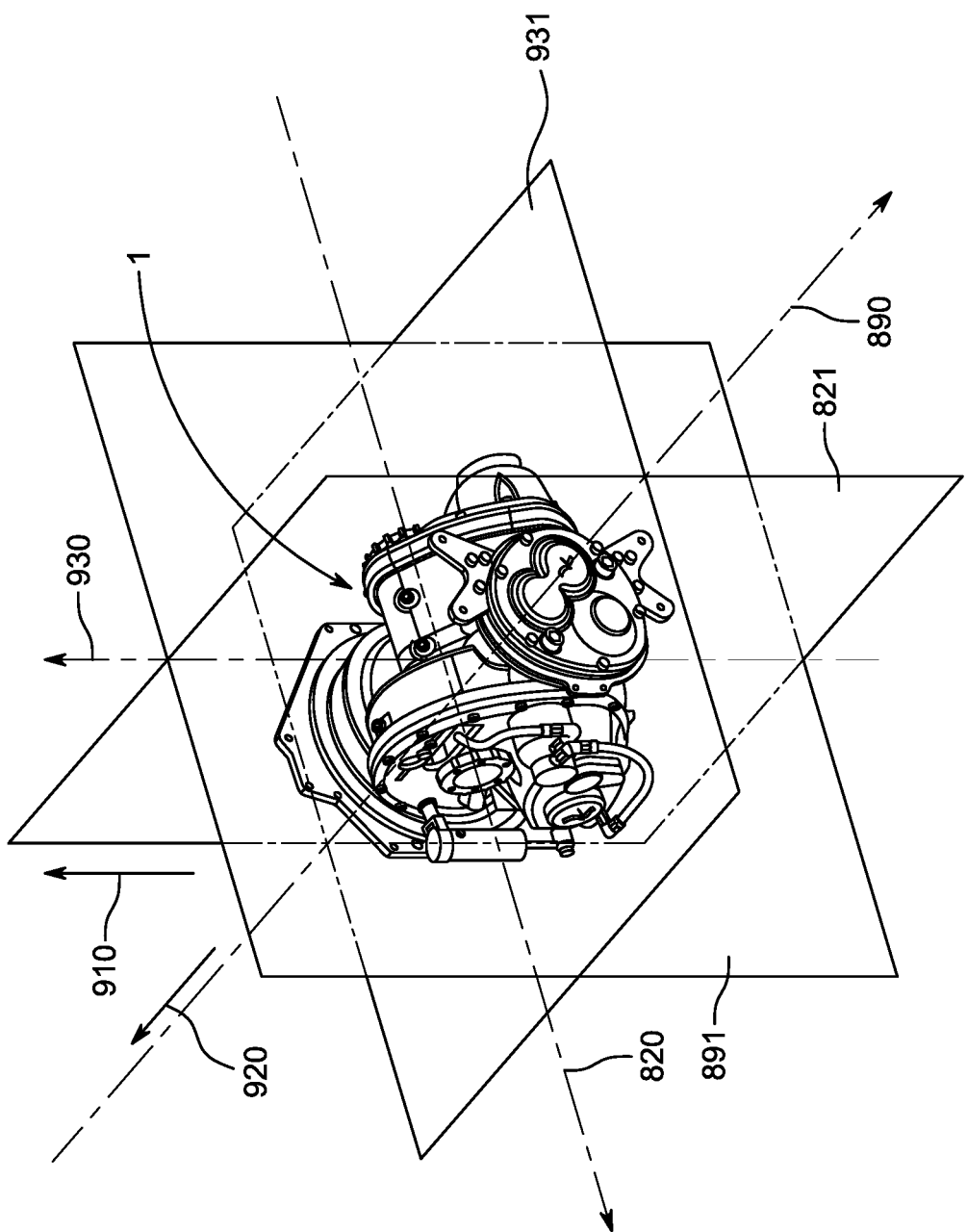
FIG. 2C depicts an exterior perspective view of the preferred embodiment of the gearbox of the present invention, showing the axes, assigned orientations and the vertical and lateral planes associated with that gearbox.
Figure 3A:
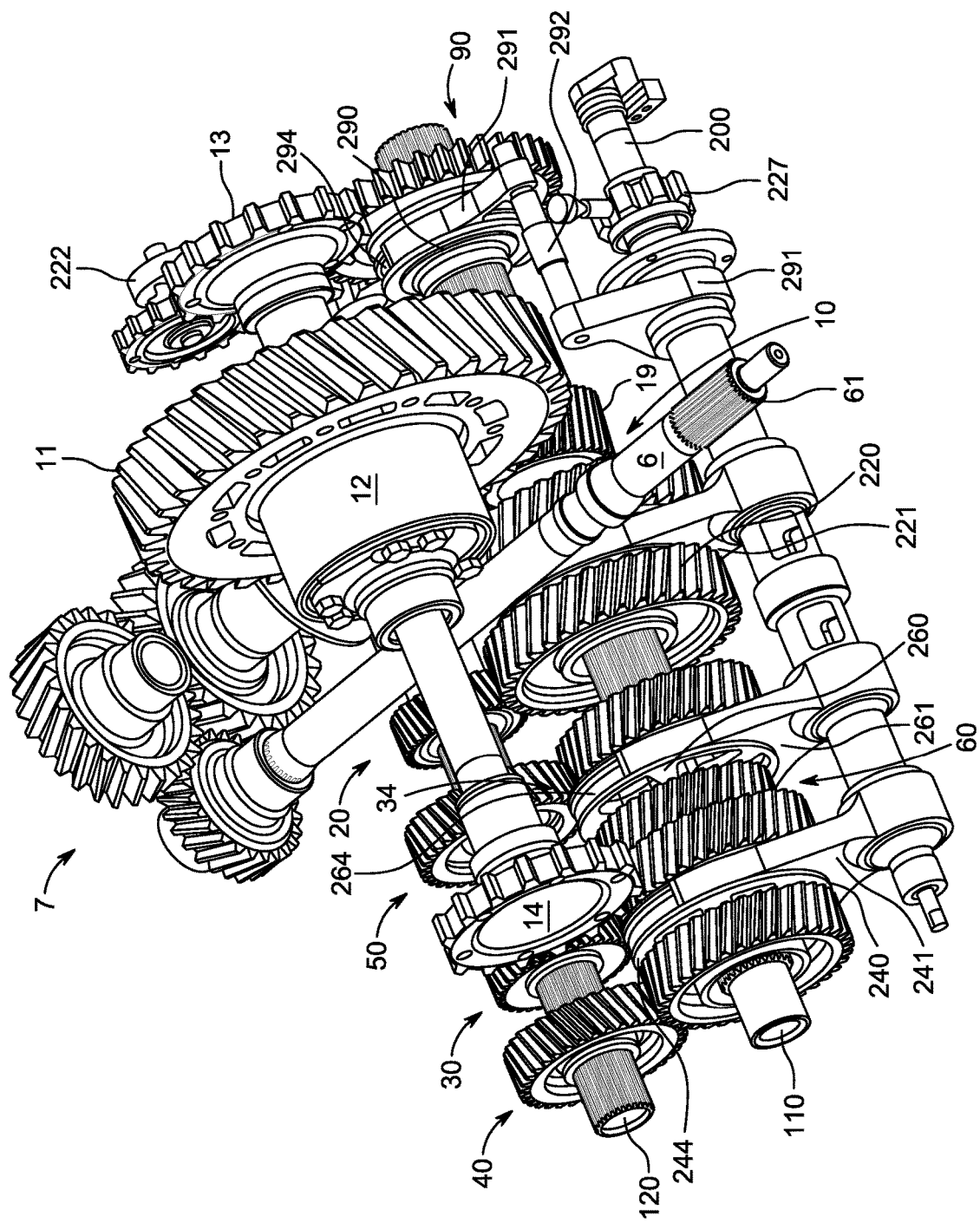
FIG. 3A is a perspective schematic illustration of the preferred gear assemblies contained within the gearbox of the present invention, viewed from the side having the second output shaft.

Gearbox 1 has an input shaft 6, shown in FIG. 3A and elsewhere, which receives torque from engine 5 through the clutch assembly. The axial centerline of input shaft 6 of gearbox 1 is indicated as 890 in FIG. 2C, and lies in a longitudinally-oriented vertical plane 821. In FIG. 2C, arrow 910 lies in a plane that is coplanar with plane 821, and arrow 910 points in an upward direction. The orientation of gearbox 1 as depicted in FIGS. 2A, 2B and 2C is arbitrarily denominated the upright orientation. Gearbox 1 constructed in accordance with this invention can be rotated in the vertical plane 891 180 degrees about axial centerline 890; i.e., it can be utilized in an inverted orientation relative to the upright orientation shown in FIG. 2A.

The axial centerline of the output shafts of gearbox 1 is depicted as centerline 820 in FIG. 2C. The axial centerline 890 of input shaft 6 is located in a horizontal plane, depicted as lateral plane 931 in FIG. 2C, and centerline 820 (the axial centerline of the output shafts) is also located in a transversely-oriented vertical plane 891. The intersection of vertical planes 821 and 891 defines vertical axis 930 of gearbox 1. In FIG. 2C, the forward orientation is arbitrarily denominated by arrow 920, and the orientation of gearbox 1 as depicted in FIGS. 1 2A, 2B and 2C is arbitrarily denominated the forward orientation. Gearbox 1 constructed in accordance with this invention can be rotated 180 degrees in the lateral plane 931 about the vertical axis 930 of gearbox 1 (shown in FIG. 2C); i.e., it can be utilized in a reversed, rearward orientation relative to the forward orientation shown in FIG. 2A.

Gearbox Components

Referring to FIGS. 2A and 2B, the primary gearing and differential gearing of gearbox 1 are contained in gearbox housing 18. FIG. 2A further depicts a gear oil pump 22 mounted on gearbox housing 18. Gear oil pump 22 has an output port 26 and a return port 25, and preferably is a mechanically-driven rotor-type fixed rate pump, the internally actuated portions of which are schematically depicted and denominated 222 in the figures. As shown in FIG. 2A, output port 26 is connected to first oil line 23 by means of a threaded fastener, and return port 25 is connected to second oil line 24 by means of a threaded fastener. Gearbox 1 has a wet sump; thus standing oil, which is maintained at a predetermined level within gearbox housing 18, is drawn into return port 25 and delivered from output port 26 to the top of gearbox housing 18 to lubricate the gearing. Lines 23, 24 can be reversed to facilitate inverting the installation of gearbox 1.

Figure 3B:
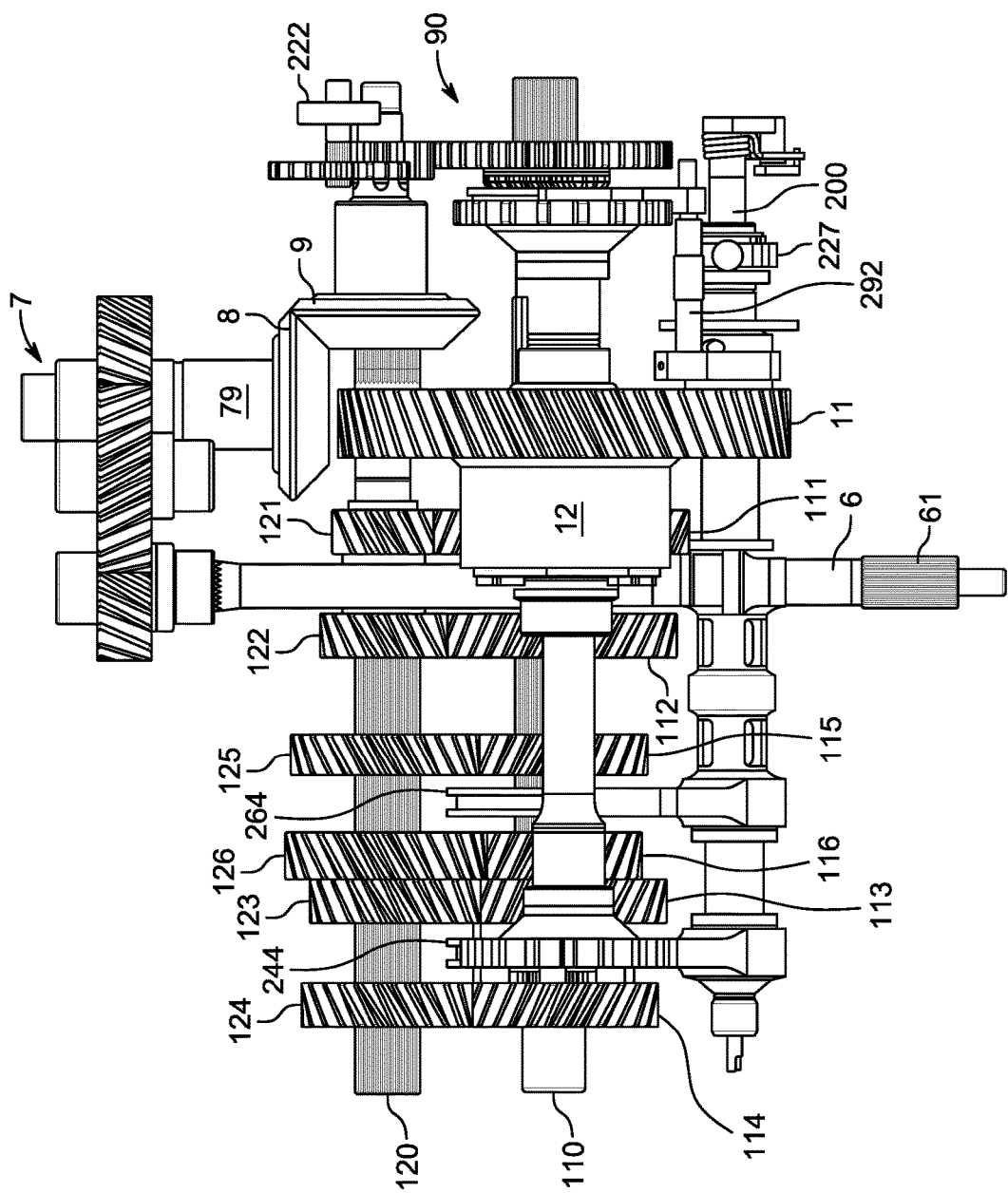
FIG. 3B is a top view schematic illustration of the preferred gear assemblies contained within the gearbox of the present invention.
Figure 3C:
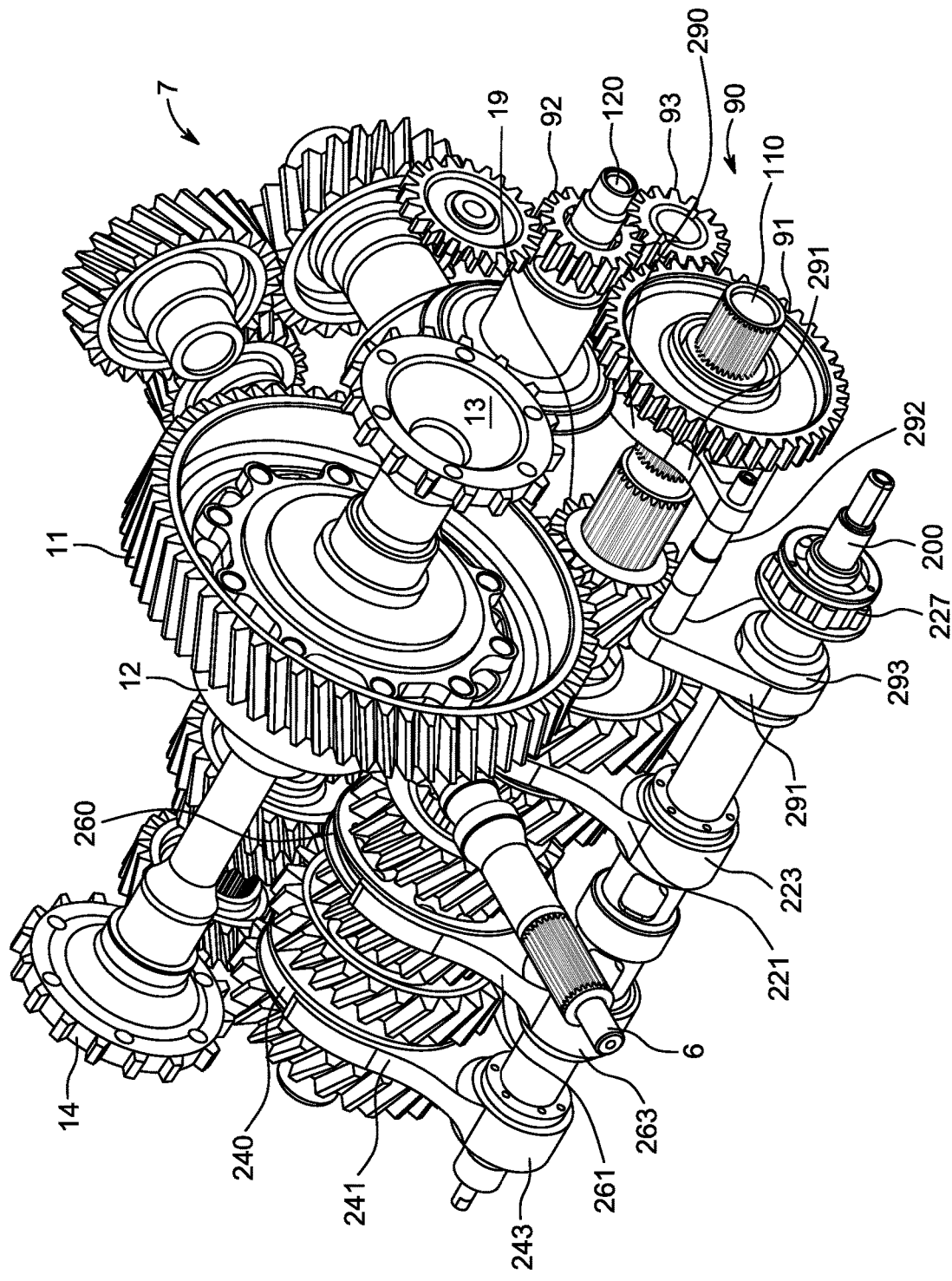
FIG. 3C is a perspective schematic illustration of the preferred gear assemblies contained within the gearbox of the present invention, viewed from the side having the first output shaft.

Referring to FIGS. 3A, 3B and 3C, the forward end of input shaft 6 includes an externally splined fitting 61 that is received by an internally splined hub located on the centerline of the clutch assembly contained within clutch housing 3. The rearward end of input shaft 6 transfers the engine torque through a fast-change ("FC") helical gear assembly 7, and then to a lay shaft 120 via bevel gear pair 8, 9 (see FIG. 3B). FC gear assembly 7 is described in greater detail below. Lay shaft 120 in turn rotates a drive shaft 110 via selective engagement of a series of gear pairs. Drive shaft 110 rotates a helical gear, pinion 19, which in turn rotates a larger helical gear, differential drive ring 11 of differential 12. Differential 12 rotates first output shaft 13 and second output shaft 14, which rotate the wheels.

The primary gearing of gearbox 1 comprises six constant mesh helical gear pairs on drive shaft 110 and lay shaft 120, which correspond to the forward gears of vehicle 4. These six meshing gear pairs are 1st gear pair 10, 2nd gear pair 20, 3rd gear pair 30, 4th gear pair 40, 5th gear pair 50 and 6th gear pair 60 (see FIG. 3A). Gears 121, 122, 123, 124, 125, and 126 of gear pairs 10, 20, 30, 40, 50 and 60 respectively (FIG. 3B) are secured with splines to maintain angular correspondence and rotate with lay shaft 120. Additionally, gears 121, 122, 123, 124, 125, and 126 are axially secured at fixed positions along lay shaft 120, and thus cannot be shifted laterally along the shaft. There is also provided as part of the primary gearing a reverse gear assembly 90 having spur gears 91, 92 mounted on drive shaft 110 and lay shaft 120 respectively. Gears 91 and 92 mesh through another spur gear (and not directly with each other), namely idler gear 93, in order to reverse the direction of rotation.

There are four gear shift clutches 220, 240, 260 and 290 (see FIGS. 3A and 3C) positioned on drive shaft 110. The gear shift clutches are secured with splines to maintain angular correspondence and rotate with drive shaft 110, but are free to be shifted laterally along the shaft. Gears 111, 112, 113, 114, 115, and 116 of gear pairs 10, 20, 30, 40, 50 and 60, as well as gear 91 of reverse gear assembly 90, are axially secured at fixed positions along the length of drive shaft 110, and thus cannot be shifted laterally along the shaft, but are mounted to freewheel on drive shaft 110 until successively engaged by a gear shift clutch, following which they are constrained to rotate with drive shaft 110. Gear shift clutch 220 engages/disengages gears 111 and 112, gear shift clutch 240 engages/disengages gears 113 and 114, and gear shift clutch 260 engages/disengages gears 115 and 116, while gear shift clutch 290 engages/disengages gear 91 only. Although six forward gears are present in the preferred embodiment, the teachings of this invention are not dependent on the number of forward gears contained within a gearbox, and can be used in a gearbox containing other numbers of forward gears.

Gearbox 1 additionally includes a selector drum 200 which has a number of exterior grooves (not visible) machined into drum 200. The exterior grooves generally are aligned about the circumference of selector drum 200 in a plane normal to the axis of selector drum 200, with this general alignment interrupted by diagonally-oriented jogs formed at selected intervals. There is also a plurality of shift forks 221, 241, 261 and 291, each of which is mounted between the selector drum 200 and a respective gear shift clutch (via an extender rod 292 in the case of gear shift clutch 290). As shown in FIG. 3C, each shift fork has a band (223, 243, 263, 293) that secures it to selector drum 200, and each band has an internal selector pin (not visible) which rides in mating engagement with a respective groove of the selector drum 200.

The slot defined by the two tines of each shift fork 221, 241, 261 and 291 respectively mates with a rotating shift sleeve 224, 244, 264 or 294 (as the case may be) joined to the respective gear shift clutch. A lever arm 201 is mounted on the axis of the selector drum 200 at terminus 22. By moving lever arm 201 a limited amount (on the order of ten degrees), selector drum 200 rotates and a particular selector pin moves through a jog in the groove in which it rides, causing the selector pin and its associated shift fork to be displaced laterally. As a result, a selected gear shift clutch is displaced laterally, which engages/disengages a gear pair, thereby shifting gears in a sequential manner A ratchet and pawl assembly 227 (shown in FIGS. 2A, 3A, 3B and in part in FIG. 3C) restricts angular movement of lever arm 201 to the desired degree. A lock-out (such as a driver-operated detent) is optionally provided to prevent inadvertent shifting between the forward gears and reverse.

The lever arm 201 can be moved in variety of ways, such as by use of a push-pull cable. Alternatively, an actuator 202 can be used, such as a hydraulic or pneumatic cylinder, or in the preferred embodiment, an electric solenoid, which is electrically energized. Energization can be either manually conducted, using a stick shift or wheel column paddles, or automatically actuated, in accordance with design preference.

Figure 3D:
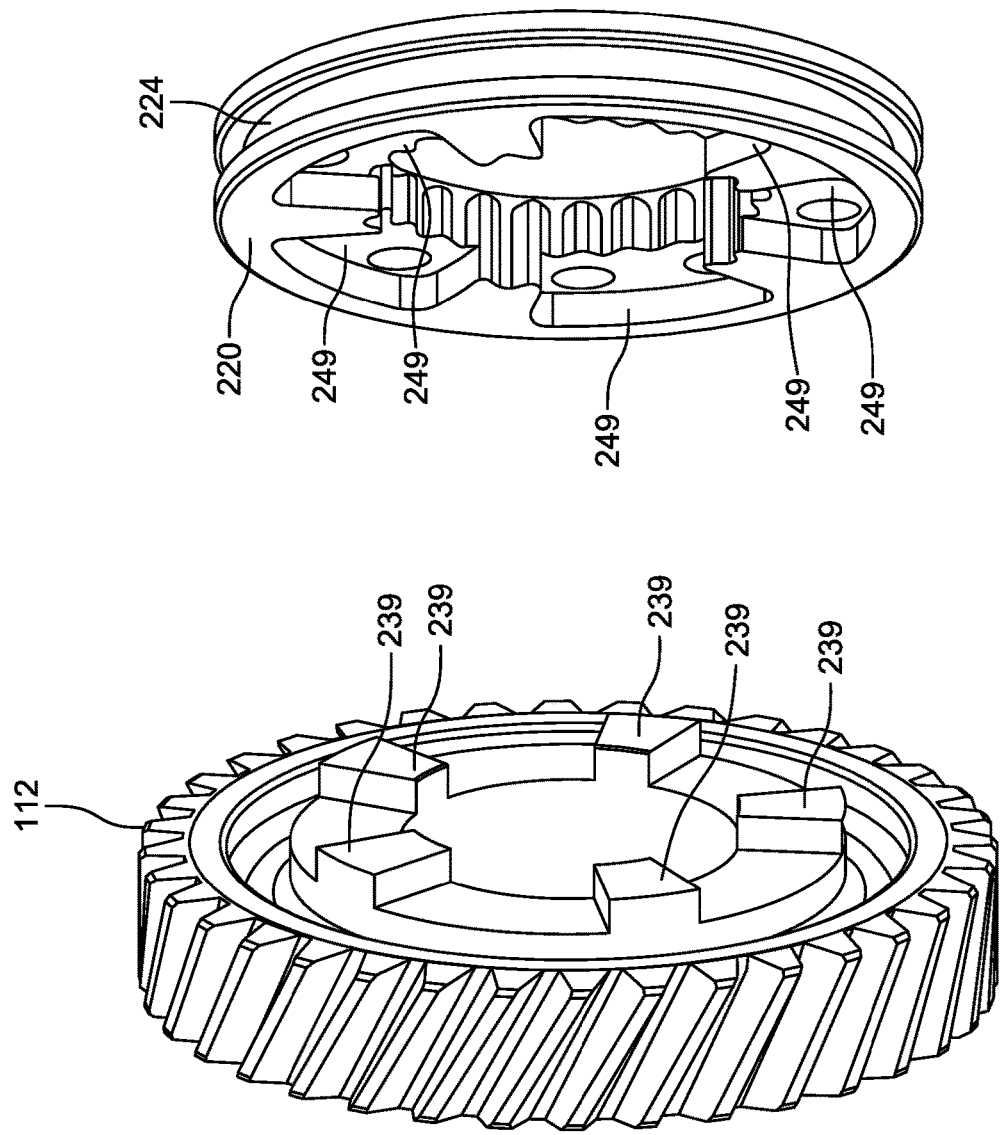
FIG. 3D is a perspective view of the components used to engage second gear on the drive shaft.

The preferred gear shift clutch arrangement for second through sixth gear is depicted in the example shown in FIG. 3D. In FIG. 3D, there is shown second gear 112, which is located on drive shaft 110. In particular, FIG. 3D shows the face of second gear 112 that engages gear shift clutch 220, and further shows the face of gear shift clutch 220 that engages second gear 112. Second gear 112 is provided with a plurality of dog teeth 239 circumferentially arranged about the face of second gear 112 facing gear shift clutch 220. In turn, gear shift clutch 220 is provided with a corresponding plurality of slots 249 circumferentially arranged about the face of gear shift clutch 220 facing second gear 112. Lateral movement of gear shift clutch 220 causes dog teeth 239 to engage and mate with slots 249, thereby causing second gear 112 to rotate with shaft 110. A similar arrangement of dog teeth and slots is used for the respective engagement of gears 113-114, and 115-116, by dogs 240 and 260.

Figure 3E:
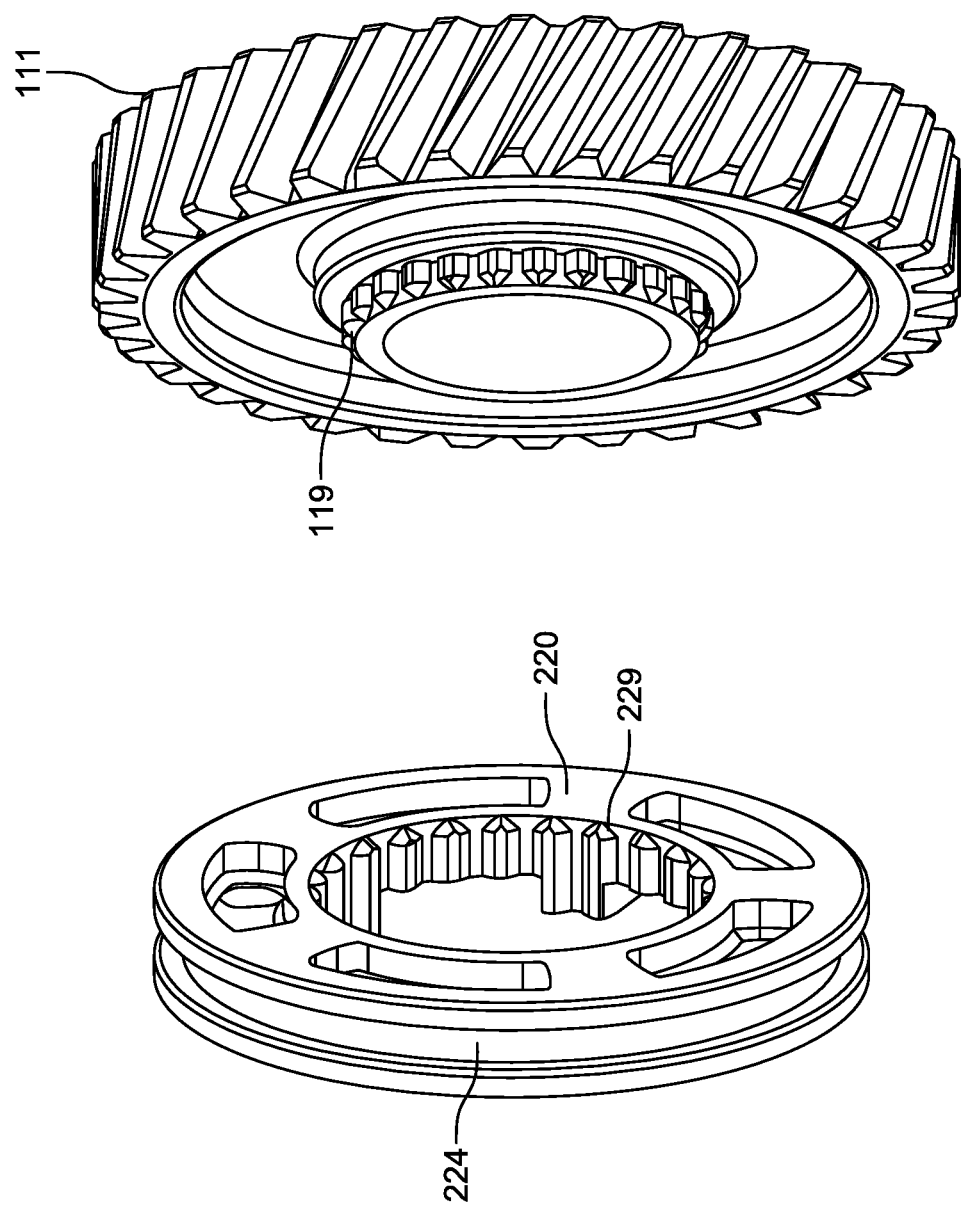
FIG. 3E is a perspective view of the synchromesh components used to engage first gear on the drive shaft.

It is preferred in gearbox 1 that first gear and reverse gear have a synchromesh engagement. For example, there is shown in FIG. 3E first gear 111, which is located on drive shaft 110. In particular, FIG. 3E shows the face of first gear 111 that engages gear shift clutch 220. There is also shown in FIG. 3E the face of gear shift clutch 220 that engages first gear 111. As can be seen, first gear 111 is provided with an annular ring 119 of external chamfered splines, and gear shift clutch 220 is provided with an annular ring 229 of internal chamfered splines. Lateral movement of gear shift clutch 220 toward first gear 111 causes annular ring 119 to engage and mate with annular ring 229, thus causing first gear 111 to rotate with drive shaft 110. The chamfers on rings 119 and 229 facilitate the rapid engagement of first gear 111 and gear shift clutch 220, and minimize the chance of a mis-shift. A similar arrangement of chamfered splines is used for the engagement of gear shift clutch 290 with reverse gear 91.

Fast Change Gears

In the preferred embodiment, FC gear assembly 7 is positioned on the rear of gearbox housing 18. As shown in the exploded view of FIG. 2B and elsewhere, FC gear assembly 7 includes FC housing 71 and FC cover plate 70, which is secured to FC housing 71 for example by a number of removable bolts 72 threaded into FC housing 71. In the alternative, a number of threaded studs can be mounted on FC housing 71, and those studs can be received by corresponding holes located about the periphery of FC cover plate 70, which can then be bolted down to secure FC cover plate 70 to FC housing 71. It is preferred that a sealing gasket be interposed between FC cover plate 70 and FC housing 71, which can be made of rubber-fiber, rubber-cork, rubber-cellulose or the like, or a compound such as RTV silicone rubber. Oil is free to pass between gearbox housing 18 and FC housing 71 through three circular galley ways, one of which, galley way 763, is visible in FIG. 2B.

Input shaft 6 extends from gearbox housing 18 into FC housing 71 through a thrust bearing 761 located in a pocket on the exterior of gearbox housing 18 within FC housing 71. (The portion of input shaft 6 within FC housing 71 is denominated the "driving shaft"). A first FC gear 73 located within FC housing 71 is mounted on input shaft 6.

There is further provided a shaft 79, which extends from FC housing 71 into gearbox housing 18 through a thrust bearing 762 (not visible) located within gearbox housing 18, and which terminates with bevel gear 8. (The portion of shaft 79 within FC housing 71 is denominated the "driven shaft"). A second FC gear 74 located within FC housing 71 is mounted on shaft 79. Bevel gear 8 and shaft 79 preferably are of one-piece construction, as may be obtained by machining from a single piece of steel stock, for added durability.

In the embodiment shown, there is additionally an optional FC idler gear 75 located within FC housing 71. Idler gear 75 meshes with first FC gear 73 and second FC gear 74. Idler gear 75 includes stub shafts 751 and 752, which are received in a first bearing pocket 753 formed in the interior of FC cover plate 70, and a second bearing pocket 754 (not visible) located on the exterior of gearbox housing 18 within FC housing 71. Each of these bearing pockets 753 and 754 includes a thrust bearing having an interference fit with the corresponding bearing pocket, such that the thrust bearings remain with FC cover plate 70 and gearbox housing 18 when idler gear 75 is removed. The thrust bearing 77 that is received in pocket 753 can be seen in the exploded view of FIG. 2B (the thrust bearing that is received in pocket 754 is not visible). Idler gear 75 and stub shafts 751 and 752 preferably are of one-piece construction, as may be obtained by machining from a single piece of steel stock, for added durability.

Upon rotation of input shaft 6, FC gear assembly 7 will cause bevel gear 8 to rotate. The rotational speed at which second FC gear 74 rotates will be the same as the speed at which first FC gear 73 rotates only in the case where they have the same diameter. In the case where they are of different diameters, their rotational speed will differ in direct proportion to the ratio of their diameters.

FC gear 73 is not fastened to shaft 6, but rather is secured by splines so as to be moveable along the axis of shaft 6. Positioned between FC cover plate 70 and FC gear 73 is a thrust bearing 76, which is received in pocket 755 formed in the interior of FC cover plate 70. Thrust bearing 76 has an interference fit with pocket 755, and thus remains in the pocket upon removal of FC cover plate 70.

FC gear 74 likewise is secured by splines to shaft 79. Positioned between FC cover plate 70 and FC gear 74 is a thrust bearing 78. Preferably, thrust bearing 78 includes a threaded connector to permit it to be fastened onto corresponding exterior threads formed on shaft 79 (not shown). Thrust bearing 78 is received in pocket 756 formed in the interior of FC cover plate 70. Thrust bearing 78 does not have an interference fit with pocket 759, but remains on shaft 79 upon removal of FC cover plate 70. Upon removal (unthreading) of thrust bearing 78, FC gear 74 is moveable along the axis of shaft 79.

When FC cover plate 70 is secured onto FC housing 71, cover plate 70 in cooperation with thrust bearings 76 and 77 prevents longitudinal movement of first FC gear 73 and FC idler gear 75 along their shafts. By removing FC cover plate 70, and then unthreading thrust bearing 78, FC gears 73, 74 and 75 can be removed from their shafts and in their place other gears can be utilized, subject to geometric constraints. FC idler gear 75 can be omitted in gearbox 2, in which case FC gears 73 and 74 are sized to have diameters resulting in them meshing directly. In one configuration in which idler gear 75 is omitted, three different FC gear pairs 73 and 74 are preferably provided for gearbox 1, with the gear pairs having different diameters, to yield three different rotational speed/torque relationships (broadly speaking, corresponding to low speed/high torque, medium speed/medium torque, and high speed/low torque). Thus in use, when a different rotational speed/torque relationship is desired, for example when changing the vehicle from a race track application to an off-road application, the user can swap out FC gears 73 and 74 for gears of different diameters.

In the preferred embodiment described herein, FC gear assembly 7 is connected to the input shaft 7 ahead of the primary gearing of gearbox 1. Alternatively, FC gear assembly 7 can be connected at other points in the power train within gearbox 1. For example, with appropriate connecting gearing FC gear assembly 7 can be connected immediately aft of the clutch assembly, ahead of input shaft 7. As another example, FC gear assembly 7 can be connected immediately aft of drive shaft 110, and ahead of pinion 19.

Figure 7:
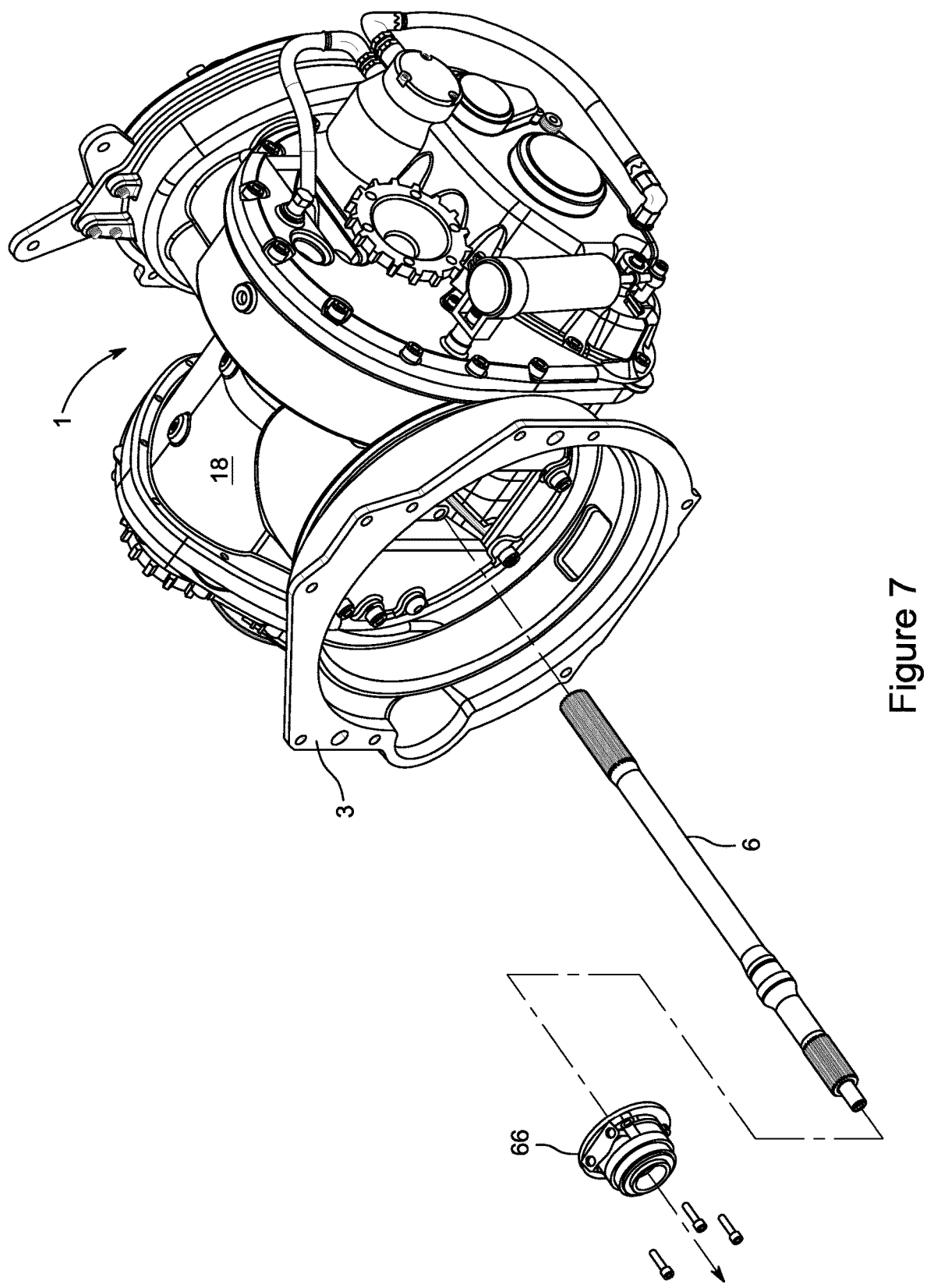
FIG. 7 is a schematic perspective view illustrating the removal of the input shaft without breaking down the gearbox.

As is apparent from FIG. 7, the design of the gearbox internals allows input shaft 6 to be inserted and removed through the front of the gearbox, without needing to break down gearbox housing 18. Input shaft 6 is fixed in its inserted position by the throw-out bearing 66. By removal of that bearing, input shaft 6 can be slid out of gearbox housing 18 and replaced by a different input shaft 6, such as one having a different spline 61, so as to be adaptable for use with a wide variety of clutch assemblies.

Gearbox 1 is optionally mounted to vehicle 4 using one or more hanger plates. Referring to FIG. 2A, there is shown rear hanger plates 630 and 640 respectively bolted to the top and bottom of FC gear housing 71, and front hanger plate 650 which is bolted in this embodiment to the front of clutch housing 3 (although shown in exploded form in FIG. 2A for clarity). Hanger plates 630, 640 and 650 are in turn bolted to appropriate portions of the vehicle 4. In the case of a vehicle 4 having a tubular exoskeleton, the hanger plates preferably are bolted to threaded bosses positioned at appropriate locations on the structural tubes forming the chassis. At each of these locations, a transverse through-hole is preferably formed in the structural tube, oriented along a diameter of the structural tube. A threaded boss is placed in the through-hole. The threaded boss is preferably welded in place, at both ends of the through-hole, to fix it in place in the structural tube.

Details regarding boss designs, associated supporting elements, and means for utilization of same, which are suitable for use as described herein, are disclosed in U.S. Provisional Application No. 62/735,966 entitled "Chassis Anchoring Systems" filed Sep. 25, 2018. The contents of U.S. Provisional Application No. 62/735,966 are hereby incorporated by reference as if fully set forth herein, including details disclosed regarding boss designs, associated supporting elements, and means for utilization of same, such as the aspects that for example correspond to paragraphs 59-65 and FIGS. 5A, 5B and 6 thereof, among others, of U.S. Provisional Application No. 62/735,966.

Employment of hanger plates 630, 640 and 650 to mount gearbox 1 in vehicle 4 provides an additional benefit of rigidifying the structure of vehicle 4 by in effect transforming gearbox 1 into a stressed member of the chassis/structural elements of vehicle 1. This strengthens the rigidity of vehicle 1, which improves vehicle handling. In particular, among other benefits hanger plate 650 serves to secure both gearbox 1 and engine 5 to the vehicle 4 and its structural elements to provide one rigid member, and better distributes the stress of the mounting points in a circular fashion about the gearbox 1 and the engine block of engine 5. Hanger plates 630/640 likewise beneficially contribute to reducing the stresses experienced by gearbox 1, as compared to a local mounting.

Hanger plates 630, 640 and 650 can be made in various sizes and configurations in accordance with design choice. For example, rear hanger plates 630 and 640 can be replaced with a circular hanger plate, similar to hanger plate 650, in order to further distribute the loads and reduce the stress borne in the region proximate to FC gear housing 71. Hanger plates 630, 640 can be laser cut from aluminum plate, with a thickness and configuration to provide a desired degree of robustness.

Further details on mounting to a vehicle, such as vehicle 4, a gearbox design that generally corresponds to gearbox 1, are disclosed in U.S. Provisional Application No. 62/616,601, filed Jan. 12, 2018, and in U.S. patent application Ser. No. 16/168,978 entitled "Gearbox Mounting System," having the same inventors as the subject application and filed on the same date as the subject application. The contents of U.S. Provisional Application No. 62/616,601 are hereby incorporated by reference as if fully set forth herein. The contents of U.S. patent application Ser. No. 16/168,978 entitled "Gearbox Mounting System," having the same inventors as the subject application and filed on the same date as the subject application, are hereby incorporated by reference as if fully set forth herein, including, as disclosed therein, gearbox hanger designs, boss designs, associated supporting elements, and means for utilization of same, which are suitable for use herein, as well as other aspects, found for example at paragraphs 22-23, 25-53, 54 (sentences 1-2), 55-58, 59 (sentences 1-5) and FIGS. 1-6B, among others.

Invertible Gearbox Mounting

The geometry and structure of the preferred embodiment is particularly adapted to be used by a manufacturer or assembler for a wide variety of vehicles, and also to permit vehicle 4 to be more easily reconfigured by the user following purchase.

Figure 4:
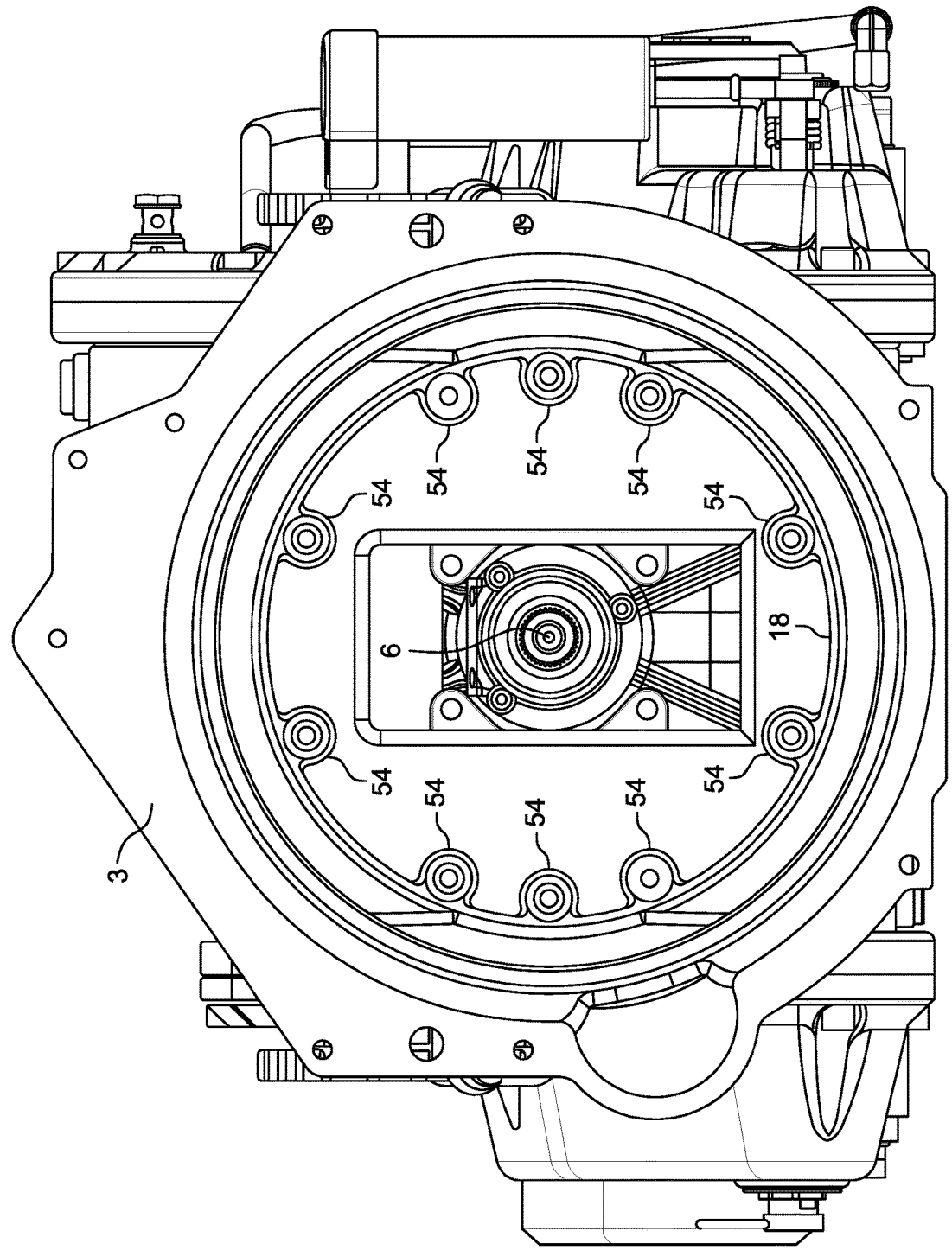
FIG. 4 is a front view of the gearbox of the present invention.

In particular, FIG. 4 shows gearbox housing 18 as seen through clutch housing 3. Gearbox housing 18 has ten mounting lugs 54, which receive eight bolts to fasten housing 18 to clutch housing 3 (in any given orientation, two lugs are not used). The ten mounting lugs are symmetrically disposed above and below lateral plane 931 and around the axial centerline of input shaft 6 so that gearbox housing 18 can be mounted to clutch housing 3 in either the upright orientation shown or in an inverted orientation.

In addition, FC cover plate 70 has two oil level view ports 701 and 702, shown for example in FIG. 2A. If gearbox 1 is utilized in the upright orientation shown in FIG. 2A and elsewhere, the correct oil level will be visible through view port 701. In the event however that gearbox 1 is utilized in an inverted orientation, then the correct oil level will be visible through view port 702. Thus, whether gearbox 1 is used in an upright or inverted orientation, the oil level in gearbox 1 will be readily determinable.

Figure 5:
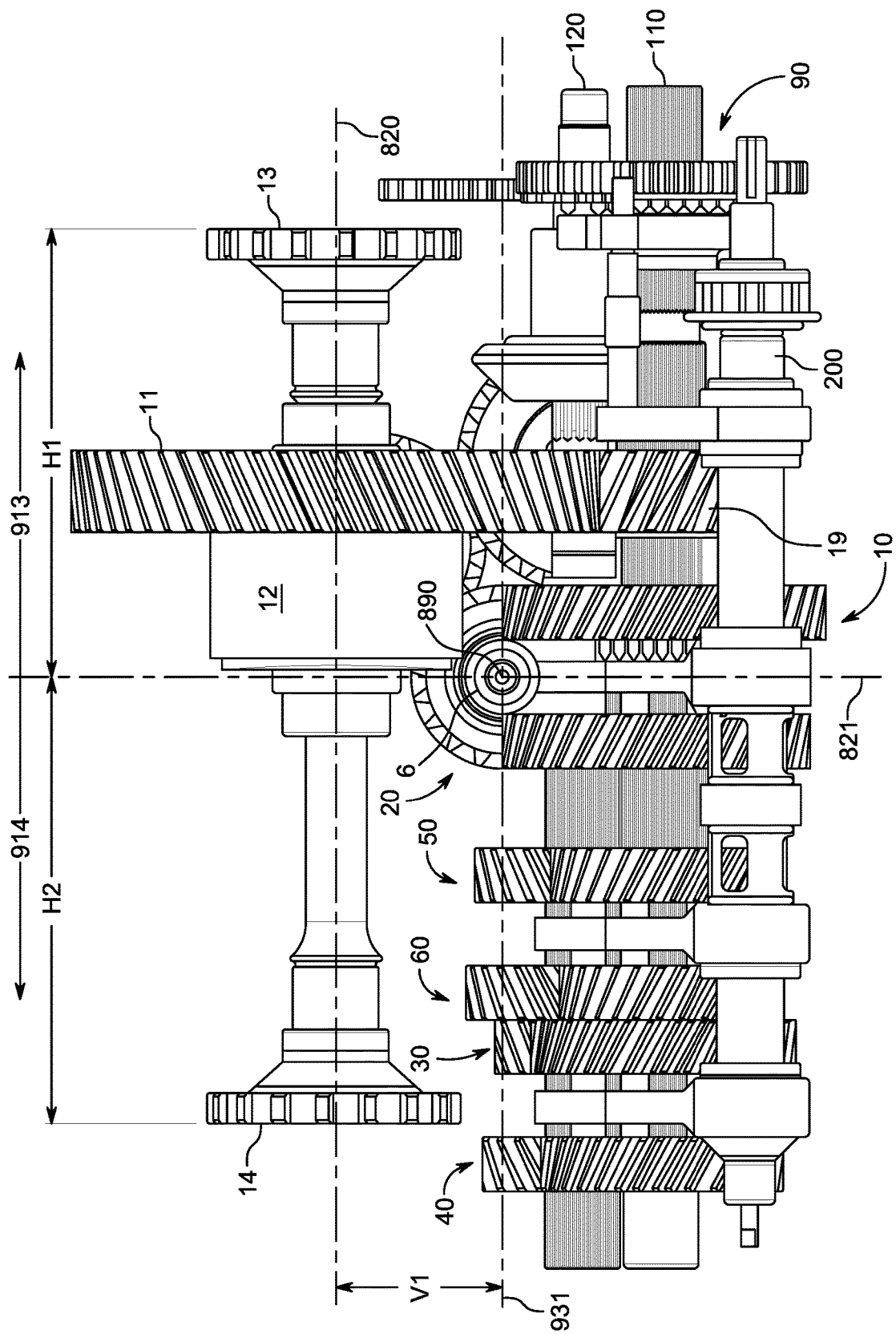
FIG. 5 is a front view schematic illustration of the preferred gear assemblies contained within the gearbox of the present invention.

As shown on in FIG. 5, input shaft 6 is positioned within lateral (horizontal) plane 931 (shown on edge in FIG. 5) and is also positioned within longitudinally-oriented vertical plane 821 (likewise shown on edge in FIG. 5). Planes 931 and 821 intersect on the axial centerline 890 of input shaft 6. In the preferred embodiment, the distance H1 between the edge of first output shaft 13 and the vertical plane 821 is approximately equal to the distance H2 between the edge of second output shaft 14 and the vertical plane 821. Further, the primary gearing (gear pairs 10, 20, 30, 40, 50, 60 and 90)—and in the transaxle configuration of gearbox 1 shown in the figures, also pinion 19, differential drive ring 11 and differential 12—are positioned to either side of vertical plane 821 such that the portions of gearbox housing 18 to each side of vertical plane 821 (denominated portions 913 and 914 in FIG. 5) are approximately symmetrically distributed—i.e., one side of gearbox housing 18 is not significantly greater or shorter in plane 931 normal to centerline 890 than the other side.

To facilitate this symmetric gearing distribution, it is preferred, in the case of a gearbox of transaxle design with six forward speeds, that five forward gear pairs be in the portion of gearbox housing 18 located on one side of the longitudinally-oriented vertical plane 821, and that the remaining forward gear pair, the reverse gear assembly and the differential gearing be in the portion of gearbox housing 18 located on the other side of vertical plane 821. Thus to yield symmetry in the vertical plane 821, referring to FIG. 5 gear pairs 20, 30, 40, 50 and 60 are located in portion 914, while gear pair 10 and reverse gear assembly 90, together with pinion 19, differential drive ring 11 and differential 12, are located in portion 913. This approximate symmetry of gearbox component distribution about the longitudinally-oriented vertical plane further facilitates mounting gearbox 1 in either of two orientations, upright or inverted. Likewise, the portions of gearbox housing 18 extending laterally to each side of vertical plane 821 are approximately equal in dimension. This approximate dimensional symmetry of gearbox housing 18 about the longitudinally-oriented vertical plane 821 additionally facilitates mounting gearbox 1 in either of two orientations, upright or inverted.

Utilization in Different Drive Train Configurations

Figure 6A:
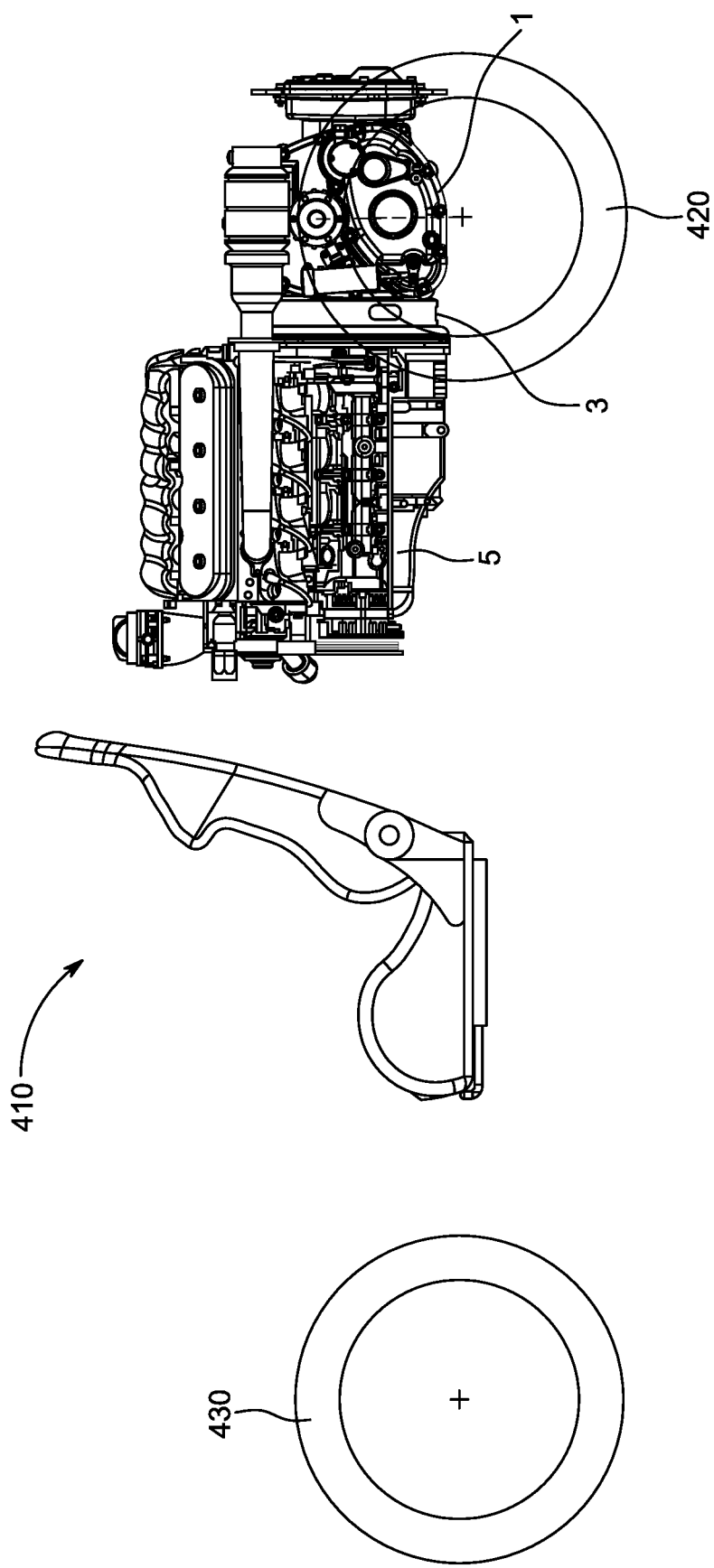
FIG. 6A is a side schematic view illustrating use of the present invention in a mid-engine, rear wheel drive configuration with the engine located to the rear of the passenger compartment and mounted forward of the rear axle, and with the gearbox mounted rearward of the engine.

Although illustrated in FIG. 1 and FIG. 6A for use with an engine mounted ahead of the driving wheels in a rear wheel drive configuration, the present invention is equally suitable for other drive train configurations.

Figure 6B:
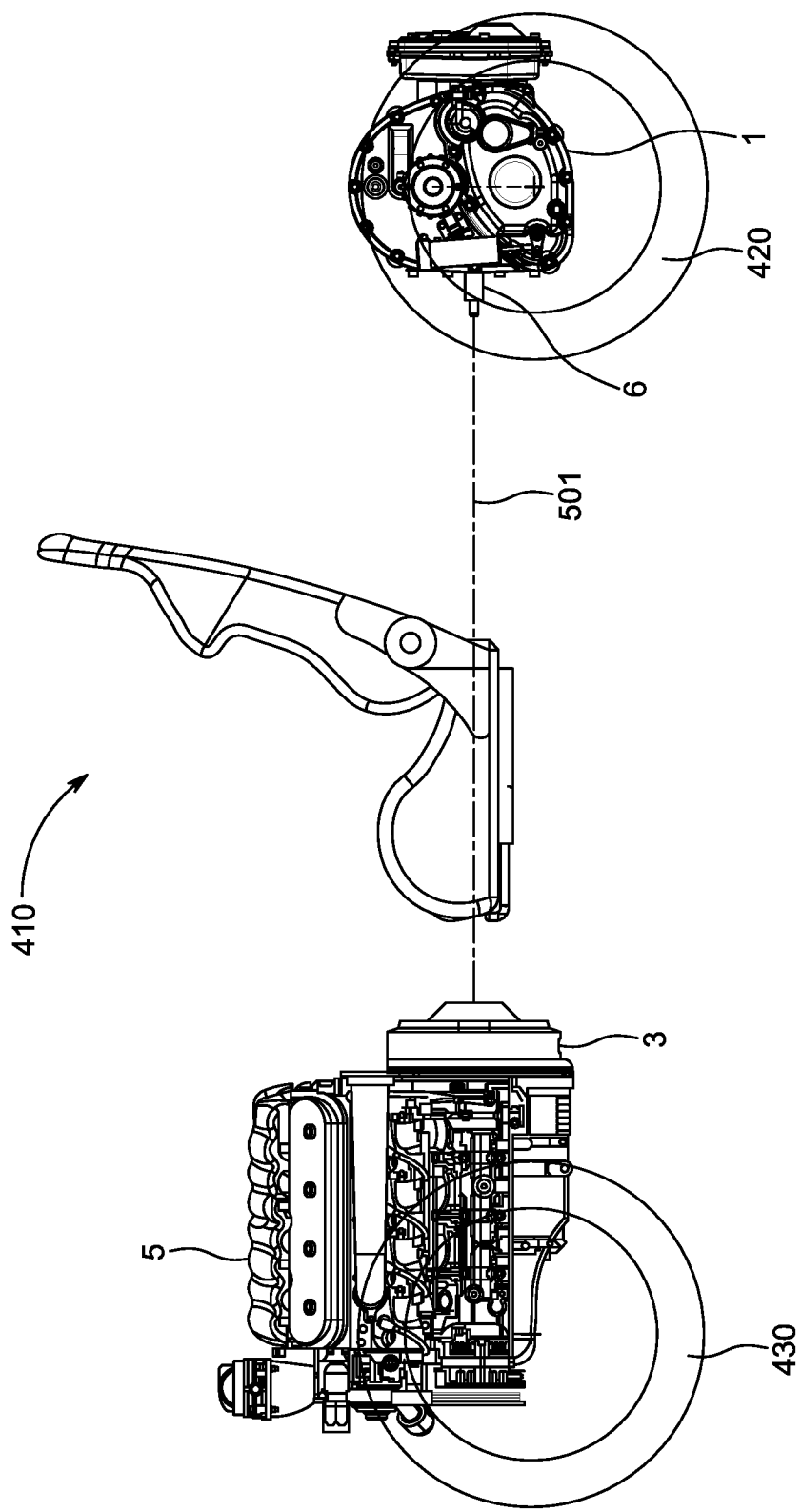
FIG. 6B is a side schematic view illustrating use of the present invention in a rear wheel drive configuration with the engine located ahead of the passenger compartment and the gearbox located to the rear of the passenger compartment.

For example, FIG. 6B is a side schematic view illustrating use of the present invention in a rear wheel drive configuration with the engine 5 located ahead of the passenger compartment 410 and the gearbox 1 located to the rear of the passenger compartment 1. Engine 5 is connected to input shaft 6 of gearbox 1 via drive shaft 501, which typically passes underneath passenger compartment 410 in a transmission tunnel (not shown). Rotation of engine 5 causes rotation of rear wheel 420 upon selection of a forward gear. The present invention can be similarly used in a front-wheel drive configuration, with the engine positioned rearward of the passenger compartment 410, the gearbox 1 positioned forward of the passenger compartment 410 to rotate front wheel 430, and a drive shaft 501 connecting gearbox 1 and engine 5.

Figure 6C:
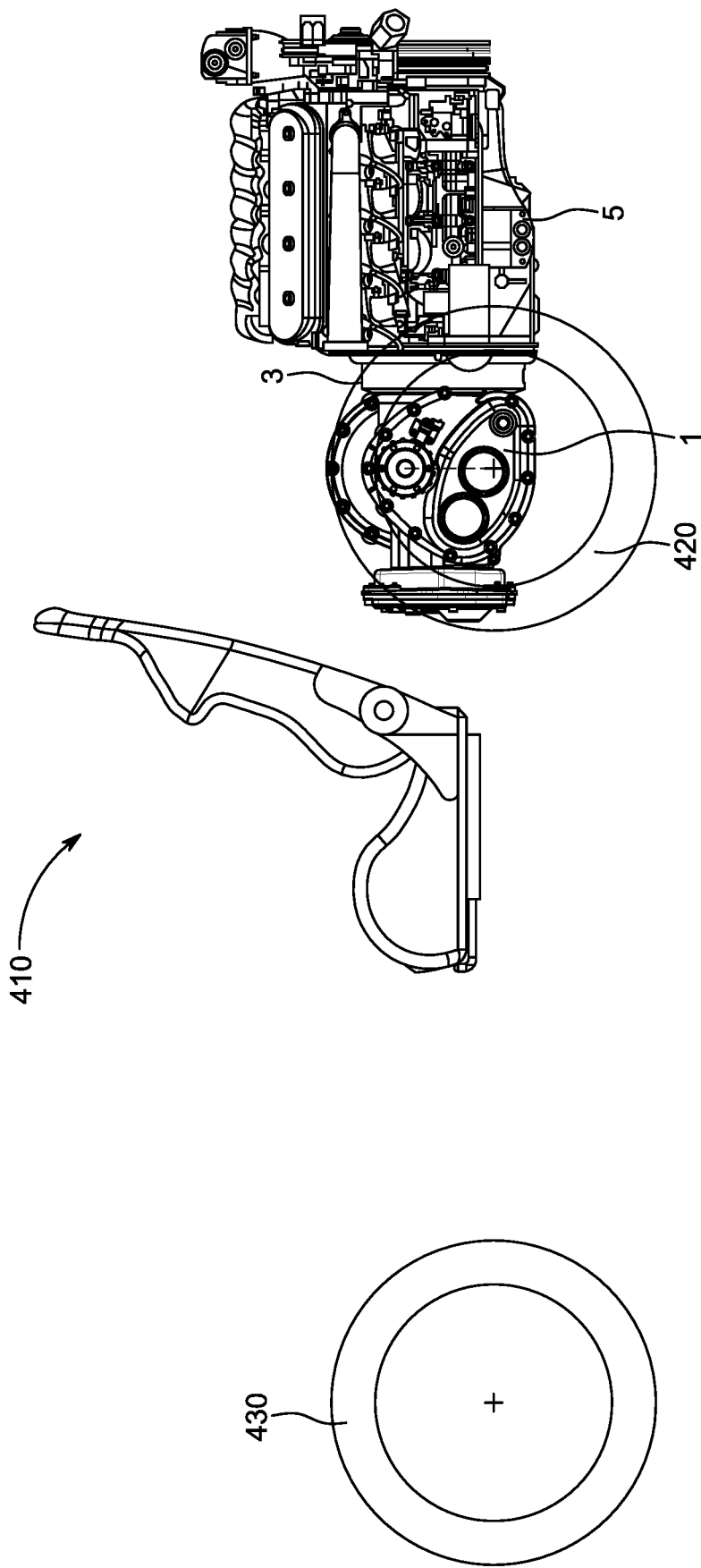
FIG. 6C is a side schematic view illustrating use of the present invention in a rear-engine, rear wheel drive configuration with the engine located to the rear of the passenger compartment and mounted rearward of the rear axle, and with the gearbox mounted forward of the engine.

As another example, FIG. 6C is a side schematic view illustrating use of the present invention in a rear-engine, rear wheel drive configuration with the engine 5 located to the rear of the passenger compartment 410, and with the gearbox 1 mounted forward of the engine 5. The present invention can be similarly used in a front-wheel drive configuration, with the engine mounted forward of the passenger compartment 410, and the gearbox 1 mounted forward of the engine 5 to rotate front wheel 430 of vehicle 4. FC gear assembly 7 facilitates utilization of gearbox 1 in these reversed orientations (relative to the forward orientation shown in FIGS. 1, 6A and 6B). Assuming that idler gear 75 is present in the forward orientation, that idler gear 75 would be omitted in the reversed orientation (proportionately increasing the diameters of FC gears 73 and 74 so that they mesh) to maintain wheel direction in the desired direction.

Variable Road Clearance

Also in the preferred embodiment, the centerline 820 of first output shaft 13 and second output shaft 14 is not located on lateral plane 931, but rather is spaced a distance V1 from lateral plane 931 (FIG. 5). Accordingly, the amount of clearance between output shafts 13 and 14 and the road surface can be changed by a distance that is two times V1, depending on whether gearbox 1 is oriented with centerline 820 above lateral plane 931 (the upright orientation), or with centerline 820 below lateral plane 931 (the inverted orientation).

Figure 6D:
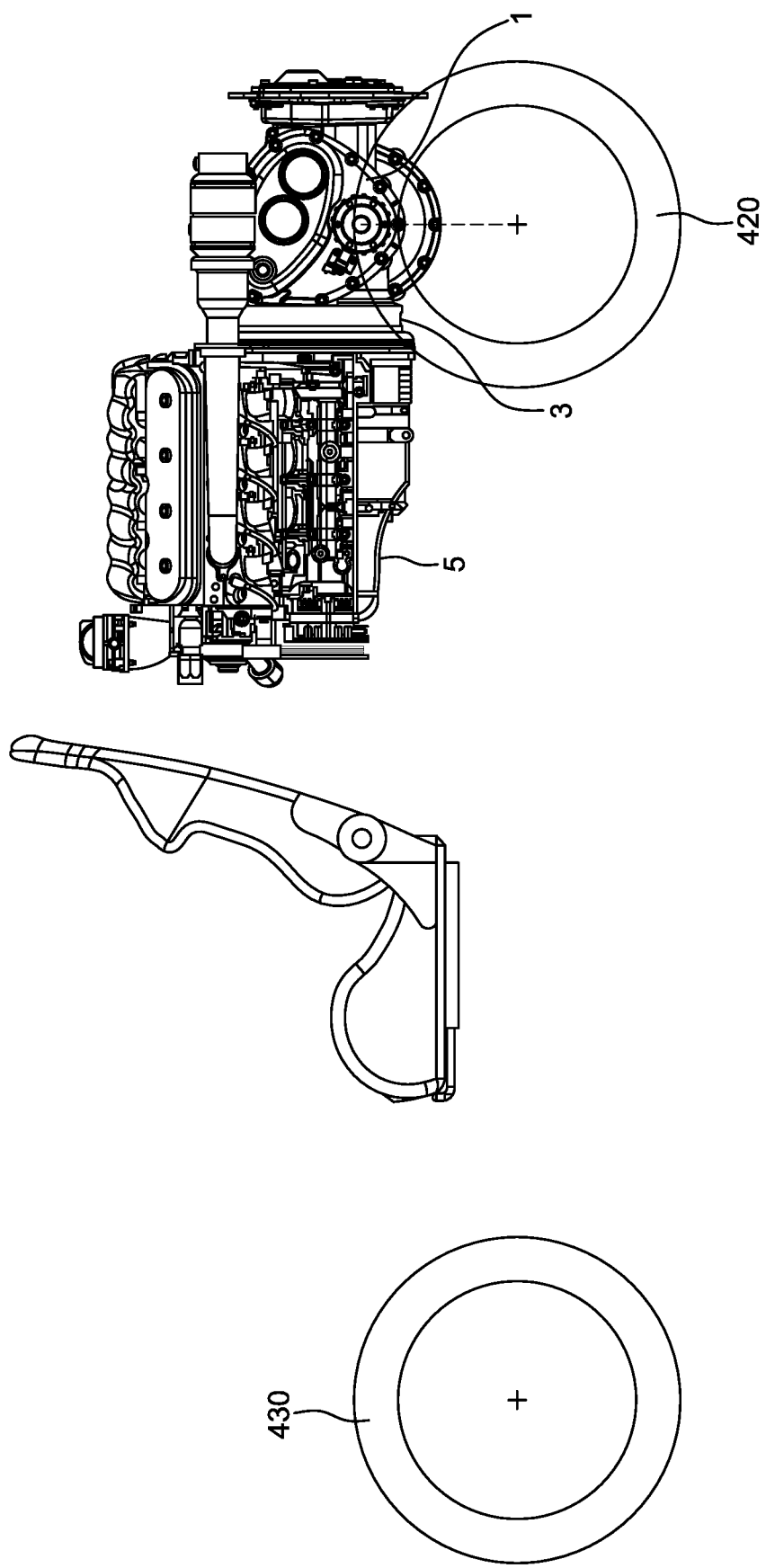
FIG. 6D is a side schematic view illustrating use of the present invention in a mid-engine, rear wheel drive configuration with the engine located to the rear of the passenger compartment and mounted forward of the rear axle, and with the gearbox mounted rearward of the engine and inverted relative to the orientation depicted in FIGS. 1 and 6A.
Figure 6E:
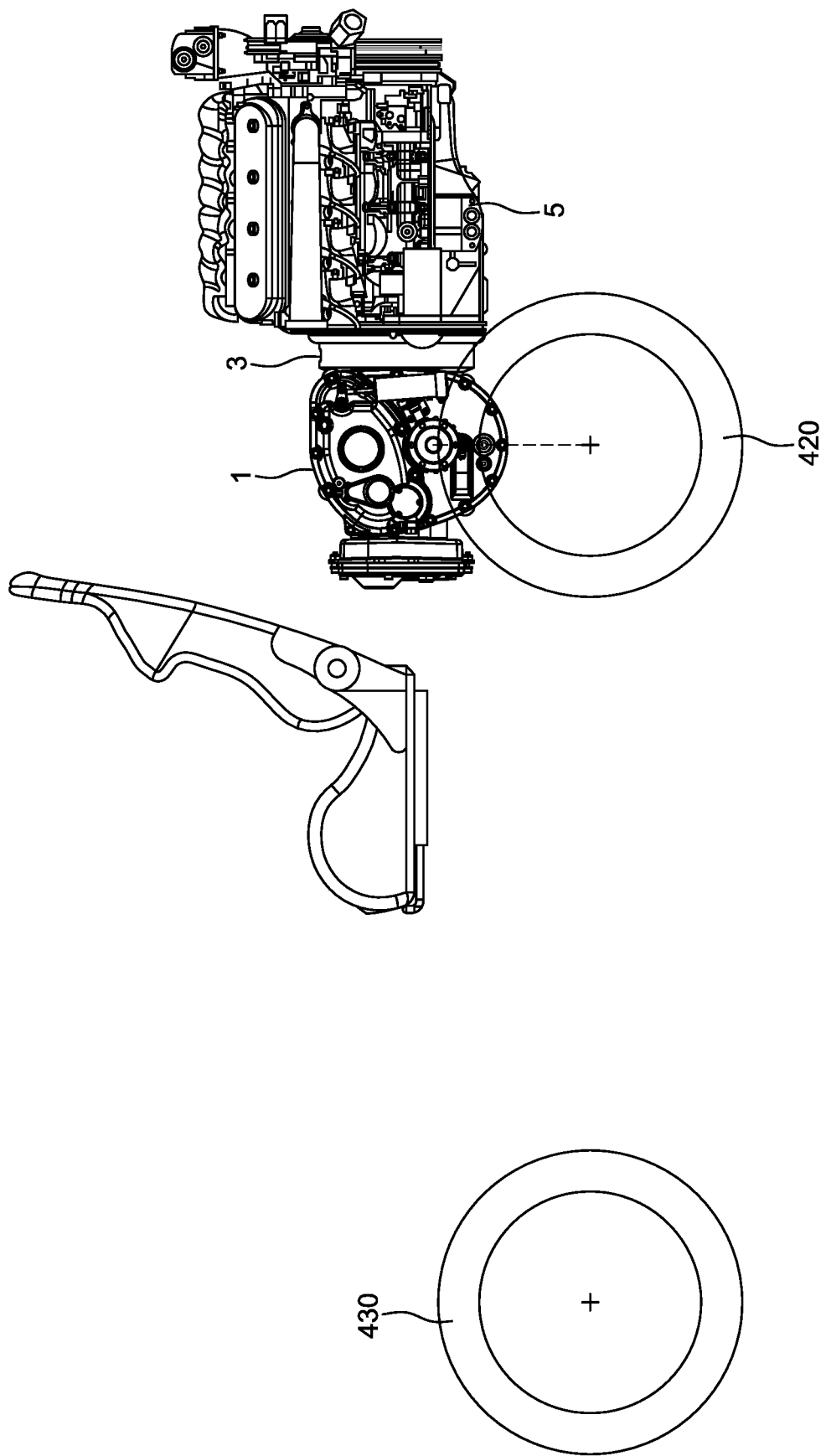
FIG. 6E is a side schematic view illustrating use of the present invention in a rear-engine, rear wheel drive configuration with the engine located to the rear of the passenger compartment and mounted rearward of the rear axle, and with the gearbox mounted forward of the engine and inverted relative to the orientation depicted in FIG. 6C.

This output shaft asymmetry in the horizontal plane makes gearbox 1 adaptable for different applications. For example, orienting gearbox 1 with centerline 820 above lateral plane 931 can be desirable in the case where vehicle 4 is intended for track use, whereas orienting gearbox 1 with centerline 820 below lateral plane 931 can be desirable in the case where vehicle 4 is intended for off-road use where it is desirable to have increased ground clearance. FIG. 6D depicts an example of the increase in ground clearance obtained by inverting a gearbox 1 used in a mid-engine, rear wheel drive configuration with the engine located to the rear of the passenger compartment and mounted forward of the rear axle, and with the gearbox mounted rearward of the engine. Except for inversion of gearbox 1, the drive train is the same as set forth in FIG. 6A. FIG. 6E depicts another example of the increase in ground clearance obtained by inverting gearbox 1 used in a rear-engine, rear wheel drive configuration with the engine located to the rear of the passenger compartment and mounted rearward of the rear axle, and with the gearbox mounted forward of the engine. Except for inversion of gearbox 1, the drive train is the same as set forth in FIG. 6C, which itself has gearbox 1 in a reversed orientation relative to the embodiment shown in FIGS. 1 and 6A. Thus the gearbox in FIG. 6E is both reversed and inverted relative to the orientation shown in FIGS. 1 and 6A.

As an additional example of the versatility of the present invention, a previously installed gearbox 1 can be inverted subsequent to vehicle purchase should the user decide to configure the vehicle for a different application. To accomplish this, in relevant part the user would separate the engine 5 from clutch housing 3, and then unbolt the eight bolts securing gearbox housing 18 to clutch housing 3. The gearbox 1 would then be inverted and bolted back onto clutch housing 3, which would then be reattached to the engine 5. In addition, oil lines 23 and 24 would be reversed: i.e., if first oil line 23 were previously connected to output port 26, it would be unthreaded and threaded onto return port 25. Likewise, if second oil line 24 were previously connected to return port 25, it would be unthreaded and threated onto output port 26.

Still further, the FC gear assembly 7 would be changed to accommodate the inversion. Thus if FC idler gear 75 were previously included in FC gear assembly 7, then upon inversion idler gear 75 would be removed (so that the vehicle's wheels would still rotate in the same direction as prior to inversion), and FC gears 73 and 74 of directly meshing diameters would be selected. Likewise, if prior to inversion there were no idler gear 75, then upon inversion an idler gear 75 would be added, and new FC gears 73 and 74 would be chosen with appropriate diameters to mesh with gear 75.

The foregoing detailed description is for illustration only and is not to be deemed as limiting the inventions, which are defined in the appended claims.

What is claimed is:

1. A gearbox, comprising:
   a gearbox housing having an exterior and an interior;
   a longitudinally oriented input shaft having a first end located exterior to the gearbox housing for receiving a rotational force from an engine;
   a gear drive train including a first shaft located within the interior of the gearbox housing for receiving the rotational force from the input shaft, a second shaft located within the interior of the gearbox housing for receiving the rotational force from the first shaft, and a plurality of meshed gear pairs mounted on the first shaft and the second shaft within the gearbox housing, the first shaft and second shaft each being laterally oriented perpendicular to the longitudinally oriented input shaft;
   means for selectively engaging one of said plurality of meshed gear pairs for transmitting the rotational force from the first shaft to the second shaft;
   at least one output shaft for receiving the rotational force from the second shaft to drive wheels, the at least one output shaft laterally oriented perpendicular to the longitudinally oriented input shaft, wherein a portion of the longitudinally oriented input shaft within the interior of the gearbox passes between (a) primary gearing assembly defined by the first shaft and the second shaft; and (b) the at least one output shaft;
   a fast-change gear assembly mounted on the exterior of the gearbox housing and interposed in the gear drive train, the fast-change gear assembly including a driving gear mounted on a driving shaft for receiving the rotational force from the input shaft, and a driven gear mounted on a driven shaft for transmitting the rotational force to the first shaft, the driving gear and the driven gear each having gear teeth in a meshing relationship;
   the driving gear rotationally coupled to the driving shaft so as to rotate with rotation of the driving shaft, and translationally uncoupled to the driving shaft to permit removal of the driving gear; and
   the driven gear rotationally coupled to the driven shaft so as to rotate the driven shaft upon rotation of the driven gear, and translationally uncoupled to the driven shaft to permit removal of the driven gear.

2. The gearbox as in claim 1, wherein the fast-change gear assembly is contained in an ancillary housing mounted on the exterior of the gearbox housing, and a cover plate overlays the driving gear and driven gear and is removably fastened to the ancillary housing, the cover plate constraining translation movement of the driving gear and the driven gear when fastened to the ancillary housing.

3. The gearbox as in claim 1, wherein the gearbox housing has a first exterior face and a second face, and the fast-change gear assembly is mounted on the first exterior face.

4. The gearbox as in claim 3, wherein the gearbox is adapted to permit removal of the longitudinally oriented input shaft through the second face.

5. The gearbox as in claim 4, further comprising a removable bearing that secures a second end of the longitudinally oriented input shaft in an inserted position within the interior of the gearbox housing, to permit removal of the longitudinally oriented input shaft upon removal of the removable bearing.

6. The gearbox as in claim 4, further comprising an externally splined fitting on the first end of the longitudinally oriented input shaft.

7. The gearbox as in claim 1, wherein the driving shaft and the driven shaft of the fast-change gear assembly are each longitudinally oriented.

8. The gearbox as in claim 7, wherein the driving shaft is a second end of the longitudinally oriented input shaft.

9. The gearbox as in claim 8, wherein the driving gear is secured by splines to the second end of the longitudinally oriented input shaft to permit movement of the longitudinally oriented input shaft relative to the driving gear.

10. The gearbox as in claim 9, further comprising a removable bearing that secures the second end of the longitudinally oriented input shaft in an inserted position within the interior of the gearbox housing, to permit removal of the longitudinally oriented input shaft upon removal of the removable bearing.

11. The gearbox as in claim 1, wherein the at least one output shaft comprises a first output shaft and a second output shaft in an opposed relationship with the first output shaft, the first output shaft and the second output shaft are each laterally oriented perpendicular to the longitudinally oriented input shaft, and the gearbox includes a differential gear assembly for receiving the rotational force from the second shaft and transmitting such rotational force to at least one of the first output shaft and the second output shaft.

12. The gearbox as in claim 11, wherein the second shaft includes a pinion and the differential gear assembly comprises a drive ring in a meshing relationship with the pinion to receive the rotational force from the second shaft.

13. The gearbox as in claim 1, wherein the means for selectively engaging one of said plurality of meshed gear pairs for transmitting the rotational force from the first shaft to the second shaft comprises a rotatable selector drum.

14. The gearbox as in claim 13, further comprising a lever arm mounted on an axis of the rotatable selector drum to rotate the rotatable selector drum.

15. The gearbox as in claim 14, further comprising an electrical solenoid to move the lever arm and rotate the rotatable selector drum.

16. The gearbox as in claim 1, wherein each of the gears of each of the plurality of meshed gear pairs is a helical gear.

17. The gearbox as in claim 1, wherein the plurality of meshed gear pairs comprises six meshed gear pairs.

18. The gearbox as in claim 1, wherein a first gear pair of the plurality of meshed gear pairs are in a synchromesh engagement.

19. An invertible multi-application gearbox, comprising:
a gearbox housing having an exterior and an interior;
a longitudinally oriented input shaft having a first end located exterior to the gearbox housing for receiving a rotational force from an engine;
a gear drive train including a first shaft located within the interior of the gearbox housing for receiving the rotational force from the input shaft, a second shaft located within the interior of the gearbox housing for receiving the rotational force from the first shaft, and a plurality of meshed gear pairs mounted on the first shaft and the second shaft within the gearbox housing, the first shaft and second shaft each being laterally oriented perpendicular to the longitudinally oriented input shaft;
means for selectively engaging one of said plurality of meshed gear pairs for transmitting the rotational force from the first shaft to the second shaft;
at least one output shaft, laterally oriented perpendicular to the longitudinally oriented input shaft, for receiving the rotational force from the second shaft to drive wheels, wherein a portion of the longitudinally oriented input shaft within the interior of the gearbox passes between (a) primary gearing assembly defined by the first shaft and the second shaft, and (b) the at least one output shaft; and wherein
the meshed gear pairs mounted on the first shaft and the second shaft are approximately symmetrically distributed about a longitudinal vertical plane containing a centerline of the input shaft;
the output shaft is separated a vertical distance from a horizontal plane containing the centerline of the input shaft; and
the gearbox housing includes a plurality of mounting location fixtures that are symmetrically disposed above and below a lateral plane containing the axial centerline of the input shaft and around such axial centerline to permit mounting the gearbox to the engine in either an upright or inverted position.

20. The invertible multi-application gearbox as in claim 19, further comprising an oil pump mounted on the gearbox housing, the oil pump having an output port and a return port; a first oil line and a second oil line to conduct oil flow between the gearbox housing and the oil pump; the output port adapted to be serially removably connected to the first oil line and to the second oil line; and the return port adapted to be serially removably connected to the first oil line and to the second oil line.

21. The invertible multi-application gearbox as in claim 19, further comprising a first oil level view port disposed on the gearbox housing to permit viewing the oil level when the gearbox is in the upright position; and a second oil level view port disposed on the gearbox housing to permit viewing the oil level when the gearbox is in the inverted position.

22. The invertible multi-application gearbox as in claim 21, wherein the at least one output shaft comprises a first output shaft and a second output shaft in an opposed relationship with the first output shaft, the first output shaft and the second output shaft are each laterally oriented perpendicular to the longitudinally oriented input shaft, and the gearbox includes a differential gear assembly for receiving the rotational force from the second shaft and transmitting such rotational force to at least one of the first output shaft and the second output shaft.

23. The invertible multi-application gearbox as in claim 22, wherein the second shaft includes a pinion and the differential gear assembly comprises a drive ring in a meshing relationship with the pinion to receive the rotational force from the second shaft.

24. The invertible multi-application gearbox as in claim 19, wherein the means for selectively engaging one of said plurality of meshed gear pairs for transmitting the rotational force from the first shaft to the second shaft comprises a rotatable selector drum.

25. The invertible multi-application gearbox as in claim 24, further comprising a lever arm mounted on an axis of the rotatable selector drum to rotate the rotatable selector drum.

26. The invertible multi-application gearbox as in claim 25, further comprising an electrical solenoid to move the lever arm and rotate the rotatable selector drum.

27. The invertible multi-application gearbox as in claim 19, wherein each of the gears of each of the plurality of meshed gear pairs is a helical gear.

28. The invertible multi-application gearbox as in claim 19, wherein the plurality of meshed gear pairs comprises six meshed gear pairs.

29. The invertible multi-application gearbox as in claim 19, wherein a first gear pair of the plurality of meshed gear pairs are in a synchromesh engagement.

30. A reversible multi-application gearbox, comprising:
a gearbox housing having an exterior and an interior;
a longitudinally oriented input shaft having a first end located exterior to the gearbox housing for receiving a rotational force from an engine;
a gear drive train including a first shaft located within the interior of the gearbox housing for receiving the rotational force from the input shaft, a second shaft located within the interior of the gearbox housing for receiving the rotational force from the first shaft, and a plurality of meshed gear pairs mounted on the first shaft and the second shaft within the gearbox housing, the first shaft and the second shaft each being laterally oriented perpendicular to the longitudinally oriented input shaft;
means for selectively engaging one of said plurality of meshed gear pairs for transmitting the rotational force from the first shaft to the second shaft;
at least one output shaft, laterally oriented perpendicular to the longitudinally oriented input shaft, for receiving the rotational force from the second shaft to drive wheels, wherein a portion of the longitudinally oriented input shaft within the interior of the gearbox passes between (a) primary gearing assembly defined by the first shaft and the second shaft, and (b) the at least one output shaft;
a fast-change gear assembly mounted on the exterior of the gearbox housing and interposed in the gear drive train, the fast-change gear assembly including a driving gear mounted on a driving shaft for receiving the rotational force from the input shaft, and a driven gear mounted on a driven shaft for transmitting the rotational force to the first shaft;
the driving gear rotationally coupled to the driving shaft so as to rotate with rotation of the driving shaft, and translationally uncoupled to the driving shaft to permit removal of the driving gear;
the driven gear rotationally coupled to the driven shaft so as to rotate the driven shaft upon rotation of the driven gear, and translationally uncoupled to the driven shaft to permit removal of the driven gear; and
the fast-change gear assembly adapted to receive an idler gear between the driving gear and the driven gear to reverse the direction of rotation of the driven gear.

31. The reversible multi-application gearbox as in claim 30, wherein the gearbox housing has a first exterior face and a second face, and the fast-change gear assembly is mounted on the first exterior face.

32. The reversible multi-application gearbox as in claim 31, wherein the gearbox is adapted to permit removal of the longitudinally oriented input shaft through the second face.

33. The reversible multi-application gearbox as in claim 32, further comprising a removable bearing that secures a second end of the longitudinally oriented input shaft in an inserted position within the interior of the gearbox housing, to permit removal of the longitudinally oriented input shaft upon removal of the removable bearing.

34. The reversible multi-application gearbox as in claim 32, further comprising an externally splined fitting on the first end of the longitudinally oriented input shaft.

35. The reversible multi-application gearbox as in claim 30, wherein the driving shaft and the driven shaft of the fast-change gear assembly are each longitudinally oriented.

36. The reversible multi-application gearbox as in claim 35, wherein the driving shaft is a second end of the longitudinally oriented input shaft.

37. The reversible multi-application gearbox as in claim 36, wherein the driving gear is secured by splines to the second end of the longitudinally oriented input shaft to permit movement of the longitudinally oriented input shaft relative to the driving gear.

38. The reversible multi-application gearbox as in claim 37, further comprising a removable bearing that secures the second end of the longitudinally oriented input shaft in an inserted position within the interior of the gearbox housing, to permit removal of the longitudinally oriented input shaft upon removal of the removable bearing.

* * * * *